United States Patent
Kwon

(10) Patent No.: US 10,305,313 B2
(45) Date of Patent: May 28, 2019

(54) ANTENNA, MANUFACTURING PROCESS THEREOF AND ELECTRONIC DEVICE USING THE ANTENNA

(71) Applicant: Samsung Electronics Co., Ltd., Gyeonggi-do (KR)

(72) Inventor: Chunbae Kwon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 266 days.

(21) Appl. No.: 15/353,918

(22) Filed: Nov. 17, 2016

(65) Prior Publication Data

US 2017/0141458 A1    May 18, 2017

(30) Foreign Application Priority Data

Nov. 17, 2015   (KR) ........................ 10-2015-0161353

(51) Int. Cl.
| | |
|---|---|
| *H01Q 1/24* | (2006.01) |
| *H02J 7/02* | (2016.01) |
| *G06F 1/16* | (2006.01) |
| *H01Q 7/00* | (2006.01) |
| *H01Q 1/22* | (2006.01) |

(52) U.S. Cl.
CPC ............ *H02J 7/025* (2013.01); *G06F 1/1626* (2013.01); *G06F 1/1635* (2013.01); *G06F 1/1637* (2013.01); *G06F 1/1656* (2013.01); *G06F 1/1698* (2013.01); *H01Q 1/2291* (2013.01); *H01Q 1/243* (2013.01); *H01Q 7/00* (2013.01)

(58) Field of Classification Search
None
See application file for complete search history.

(56) References Cited

U.S. PATENT DOCUMENTS

| | | | |
|---|---|---|---|
| 7,319,430 B2 * | 1/2008 | Watanabe .............. | H01Q 3/446 343/700 MS |
| 2005/0200530 A1 * | 9/2005 | Aikawa .................. | H01Q 9/145 343/700 MS |

(Continued)

FOREIGN PATENT DOCUMENTS

KR    10-1399835 B1    5/2014

*Primary Examiner* — Trinh V Dinh
(74) *Attorney, Agent, or Firm* — Cha & Reiter, LLC

(57) ABSTRACT

According to an exemplary embodiment of the present disclosure, an electronic device may include a housing having a first side facing a first direction, and a second side facing a second direction opposite to the first direction, a communication circuit disposed inside the housing, a display exposed through the first side of the housing, a conductive plate formed adjacent to the second side of the housing, a conductive coil formed inside the conductive plate when viewed from a top of the second side, and having a plurality of turns electrically connected to the communication circuit, a first non-conductive material formed inside the conductive plate when viewed from the top of the second side, and disposed at least partially between the conductive plate and the conductive coil and/or between the plurality of turns of the conductive coil, and a second non-conductive material for forming at least one part of the second side, and covering the conductive plate, the conductive coil, and the first non-conductive material. Various other exemplary embodiments are also possible.

13 Claims, 29 Drawing Sheets

(56) References Cited

U.S. PATENT DOCUMENTS

2006/0220773 A1* 10/2006 Su .................... H01F 17/0006
                                              336/200
2014/0002313 A1    1/2014 Yang et al.
2014/0092543 A1    4/2014 Yang et al.
2014/0125544 A1*  5/2014 Tatarnikov ......... H01Q 15/0013
                                              343/848

* cited by examiner

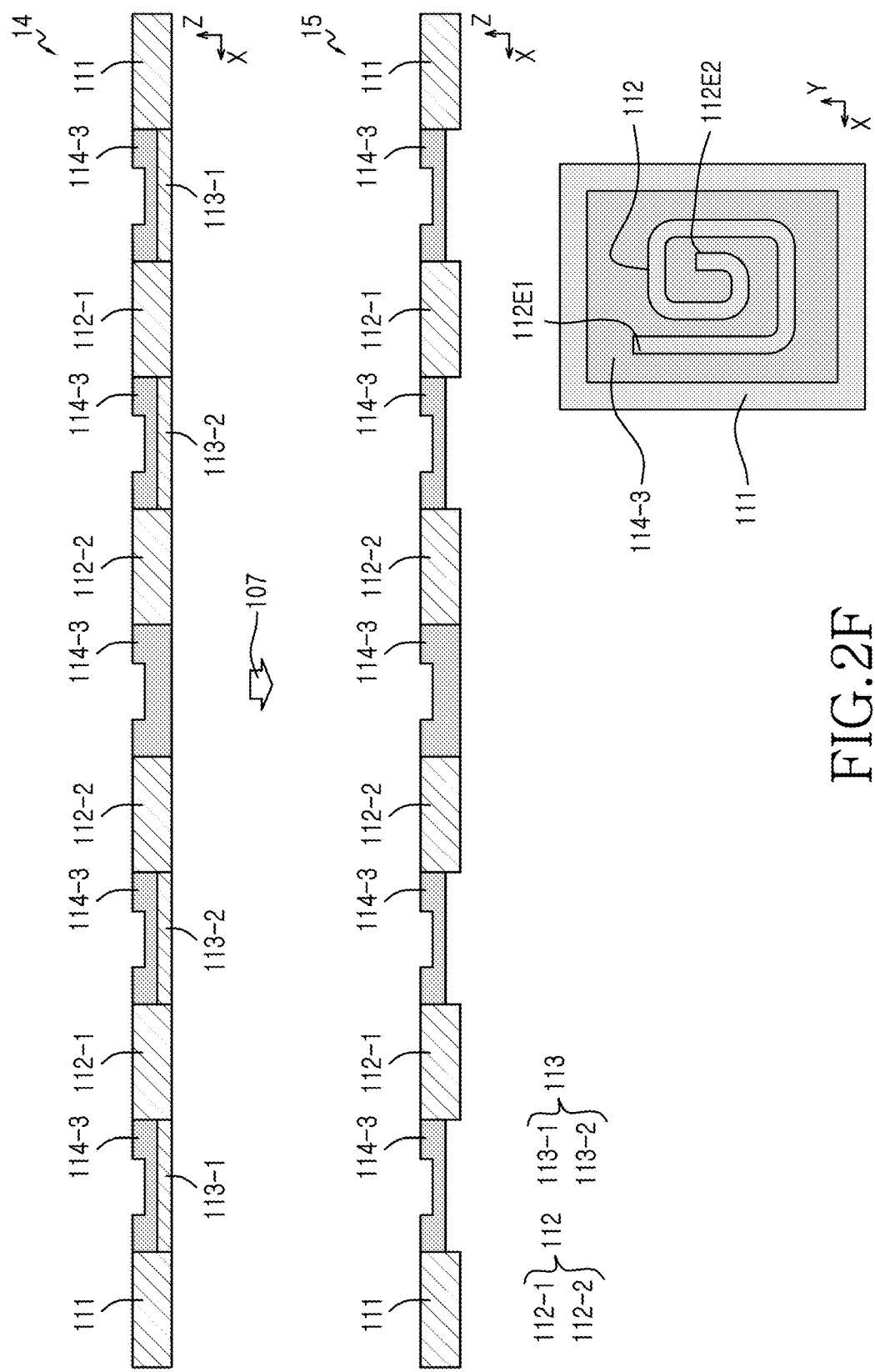

US 10,305,313 B2

ANTENNA, MANUFACTURING PROCESS THEREOF AND ELECTRONIC DEVICE USING THE ANTENNA

CLAIM OF PRIORITY

This application claims the benefit under 35 U.S.C. § 119(a) of a Korean patent application filed in the Korean Intellectual Property Office on Nov. 17, 2015 and assigned Serial No. 10-2015-0161353, the entire disclosure of which is hereby incorporated by reference.

BACKGROUND

1. Field of the Invention

Various exemplary embodiments of the present disclosure relate to an electronic device including an antenna.

2. Description of the Related Art

Electronic devices may have at least one antenna suitable for services such as location tracking, wireless internet, global roaming service, or the like.

From a design aspect, if an antenna is installed in electronic devices where the devices are thin and the space for mounting the antenna is insufficient, it may be difficult to ensure an antenna performance.

SUMMARY

Various exemplary embodiments of the present disclosure can provide an electronic device with antennas that ensure antenna performance by using an antenna which is manufactured to overcome the size (thickness) limitation of the electronic device.

Various exemplary embodiments of the present disclosure can also be used to form the exterior housing of an electronic device while simplifying the antenna manufacturing process.

According to an exemplary embodiment of the present disclosure, an electronic device may include a housing having a first side facing a first direction, and a second side facing a second direction opposite to the first direction, a communication circuit disposed inside the housing, a display exposed through the first side of the housing, a conductive plate formed adjacent to the second side of the housing, a conductive coil formed inside the conductive plate when viewed from a top of the second side, and having a plurality of turns electrically connected to the communication circuit, a first non-conductive material formed inside the conductive plate when viewed from the top of the second side, and disposed at least partially between the conductive plate and the conductive coil and/or between the plurality of turns of the conductive coil, and a second non-conductive material for forming at least one part of the second side, and covering the conductive plate, the conductive coil, and the first non-conductive material.

According to an exemplary embodiment of the present invention, a method of manufacturing a housing of an electronic device may include forming a conductive plate, a conducive coil having a plurality of turns, and a plurality of bridges by removing one part of a base metal. Herein, the plurality of bridges may have at least one first bridge for connecting between the conductive plate and the conductive coil and at least one second bridge for connecting between the plurality of conductive coils, coupling a non-conductive member to the conductive plate, the conductive coil, and the plurality of bridges, and separating physically the conductive plate and the conductive coil by removing the plurality of bridges.

According to one or more exemplary embodiments of the present disclosure, an antenna manufacturing method can decrease manufacturing process and cost, and can improve usage of space within an electronic device.

BRIEF DESCRIPTION OF THE DRAWINGS

FIG. 2E, FIG. 2F and FIG. 2G illustrate a method of manufacturing a housing according to another exemplary embodiment of the present disclosure;

DETAILED DESCRIPTION

Figure 1:
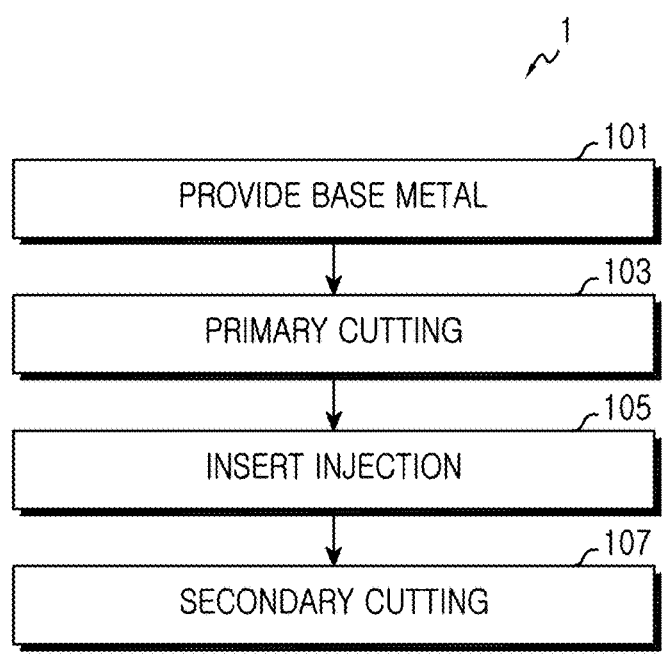
FIG. 1 illustrates a flowchart of a method of manufacturing a housing according to an exemplary embodiment of the present disclosure.

Hereinafter, various embodiments of the present disclosure are described with reference to the accompanying drawings. It should be understood, however, that it is not intended to limit the various embodiments of the present document to the particular form disclosed, but, on the contrary, it is intended to cover all modifications, equivalent, and alternatives falling within the spirit and scope of the various embodiments of the present document. Like reference numerals denote like components throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B," "A and/or B," or "one or more of A and/or B" or the like may include all possible combinations of items enumerated together. For example, "A or B," "at least one of A and B," or "at least one of A or B" may indicate all cases where: (1) at least one A is included; (2) at least one B is included; and (3) at least one A and at least one B are both included.

In the various embodiments, although expressions such as "1st", "2nd", "first", and "second" may be used to express various constitutional elements, it is not intended to limit the corresponding constitutional elements. The above expressions may be used to distinguish one constitutional element from another constitutional element. For example, a 1st user device and a 2nd user device are both user devices, and indicate different user devices. For example, a 1st constitutional element may be termed a 2nd constitutional element, and similarly, the 2nd constitutional element may be termed the 1st constitutional element without departing from the scope of the present document.

When a certain constitutional element (e.g., the 1st constitutional element) is mentioned as being "operatively or communicatively coupled with/to" or "connected to" a different constitutional element (e.g., the 2nd constitutional element), it is to be understood that the certain constitutional element is directly coupled with/to another constitutional element or can be coupled with/to the different constitutional element via another constitutional element (e.g., a 3rd constitutional element). On the other hand, when the certain constitutional element (e.g., the 1st constitutional element) is mentioned as being "directly coupled with/to" or "directly connected to" the different constitutional element (e.g., the 2nd constitutional element), it may be understood that another constitutional element (e.g., the 3rd constitutional element) is not present between the certain constitutional element and the different constitutional element.

An expression "configured to" used in the present document may be interchangeably used with, for example, "suitable for," "having the capacity to," "designed to," "adapted to," "made to," or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor (AP)) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art to which various embodiments of the present document belong. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

An electronic device according to various embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. According to various embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to certain embodiments, the electronic device may be a home appliance. The home appliance may include, for example, at least one of a Television (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to certain embodiments, the electronic device may include at least one of furniture or a part of building/constructions, an electronic board, an electronic signature input device, a projector, and various measurement machines (e.g., water supply, electricity, gas, propagation measurement machine, etc.). The electronic device according to various embodiments of the present disclosure may be one or more combinations of the aforementioned various devices. The electronic device according to certain embodiments may be a flexible device. Further, the electronic device according to one embodiment of the present document is not limited to the aforementioned devices, and may include a new electronic device depending on technical progress.

Hereinafter, an electronic device according to various embodiments will be described with reference to the accompanying drawings. The term 'user' used in the present document may refer to a person who uses the electronic device or a device which uses the electronic device (e.g., an Artificial Intelligence (AI) electronic device).

Figure 2A:
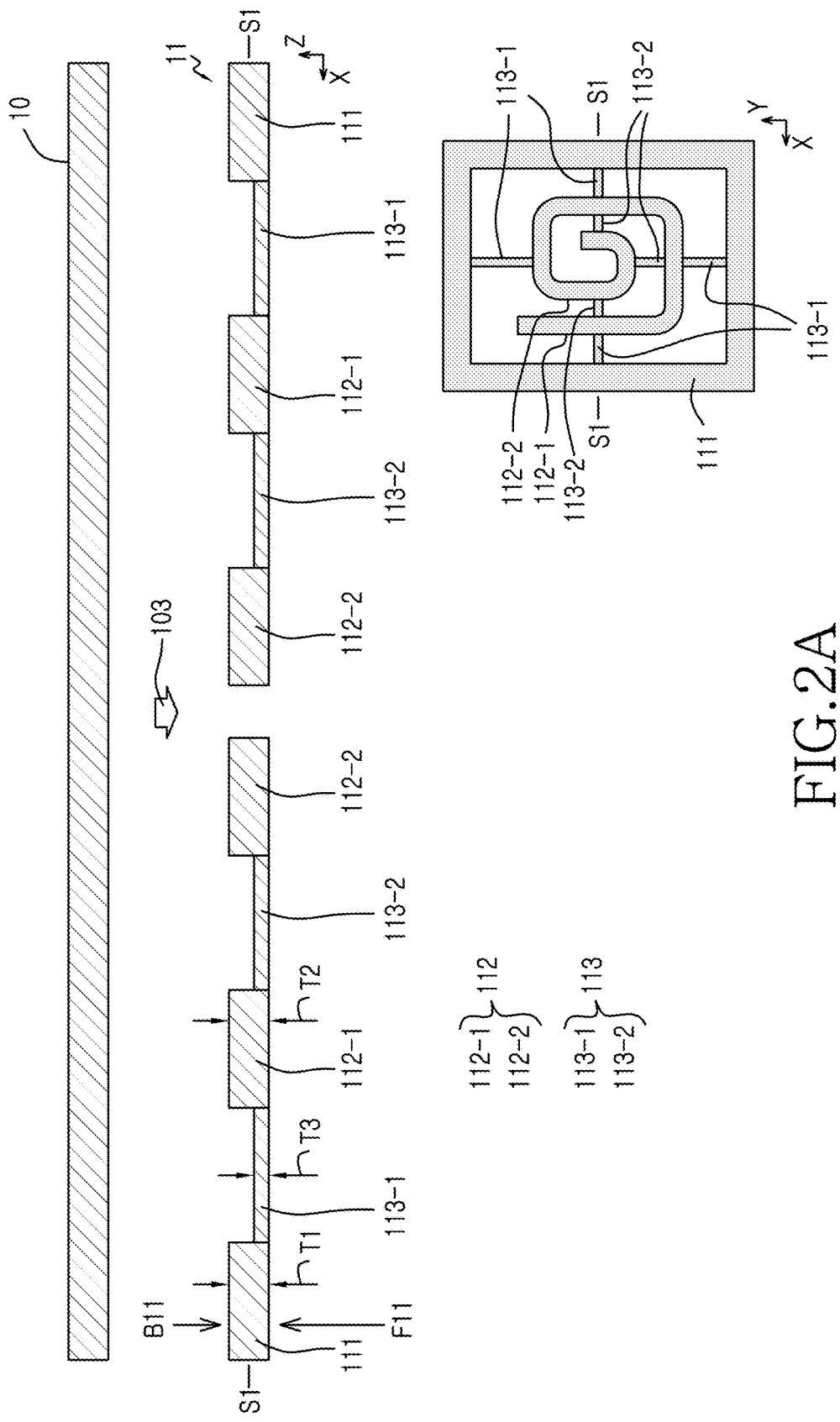
FIG. 2A, FIG. 2B, FIG. 2C and FIG. 2D illustrate a method of manufacturing a housing according to an exemplary embodiment of the present disclosure.

FIG. 1 illustrates a flowchart of a method 1 of manufacturing a housing according to an exemplary embodiment of the present disclosure. FIG. 2A to FIG. 2D illustrate a method of manufacturing a housing according to an exemplary embodiment of the present disclosure. FIG. 2E to FIG. 2G illustrate a method of manufacturing a housing according to another exemplary embodiment of the present disclosure. FIG. 2H to FIG. 2I illustrate a method of manufacturing a housing according to another exemplary embodiment of the present disclosure.

Referring to FIG. 1 and FIG. 2A, in operation 101, a base metal 10 having an electrical conductivity may be provided.

Referring to FIG. 1 and FIG. 2A, in operation 103, at least one part of the base metal 10 may be removed by using a primary cutting. According to an exemplary embodiment, the first primary cutting process may be performed on the base metal 10 to form a 1st processed product 11 including a conductive plate (or a base plate) 111, an antenna pattern 112, and a plurality of bridges 113.

According to an exemplary embodiment, the conductive plate 111 may surround at least one part of the antenna pattern 112 and the plurality of bridges 113. For example, the conducive plate 111 may roughly be in a ring shape that encapsulates or surrounds the antenna pattern 112.

According to an exemplary embodiment, the antenna pattern 112 may be a conductive coil including a plurality of turns 112-1 and 112-2. For example, the antenna pattern 112 may include a single coil having the plurality of turns (hereinafter, a "conductive coil").

According to an exemplary embodiment, the plurality of bridges 113 include at least one 1st bridge 113-1 for connecting the conductive plate 111 and the conductive coil 112. The plurality of bridges 113 may include at least one 2nd bridge 113-2 for connecting the plurality of turns 112-1 and 112-2 of the conductive coil 112. For example, the conductive coil 112 may be coupled to the conductive plate 111 by means of the at least one 1st bridge 113-1.

According to an exemplary embodiment, the plurality of bridges 113 may prevent the conductive coil 112 from being detached from the conductive plate 111 during the process of manufacturing the housing member.

According to an exemplary embodiment, the plurality of bridges 113 may also prevent the conductive coil 112 from being deformed during the process of manufacturing the housing member. For example, the conductive coil 112 may be designed to be flat within a certain tolerance and may be deformed when an external force (e.g., an external shock) is applied. Such deformation may be prevented by the bridges 113, which can be used to support the conductive coil 112 and improve the flatness of the conducive coil 112.

According to an exemplary embodiment, a thickness T1 of at least one part of the conductive plate 111 may be greater than a thickness T2 of the conductive coil 112. This may improve a robustness of the 1st processed product 11.

According to an exemplary embodiment, the 1st processed product 11 may include a front side F11 and a back side B11 opposite to the front side F11. According to an exemplary embodiment, the at least one part of conductive coil 112 may not protrude than the conductive plate 111 in the back side B11 to the front side F11 direction, or in the front side F11 to the back side B11 direction. According to various exemplary embodiments, the conductive coil 112 may be thinner than the conductive plate 111, and the conductive coil 112 may not protrude in the back side B11 to the front side F11 direction.

According to an exemplary embodiment, a thickness T3 of the plurality of bridges 113 may be less than the thickness T1 of the conductive plate 111 and/or the thickness T2 of the conductive coil 112.

According to an exemplary embodiment, at least one part of the plurality of bridges 113 may not protrude than the conductive plate 111 and/or the conductive coil 112 in the back side B11 to the front side F11 direction, or in the front side F11 to the back side B11 direction.

According to an exemplary embodiment, one part of the conductive plate 111 may protrude less than other parts in the back side B11 to the front side F11 direction, or in the front side F11 to the back side B11 direction.

According to an exemplary embodiment, one part of the conductive coil 112 may protrude less than other parts in the back side B11 to the front side F11 direction, or in the front side F11 to the back side B11 direction.

Figure 2B:
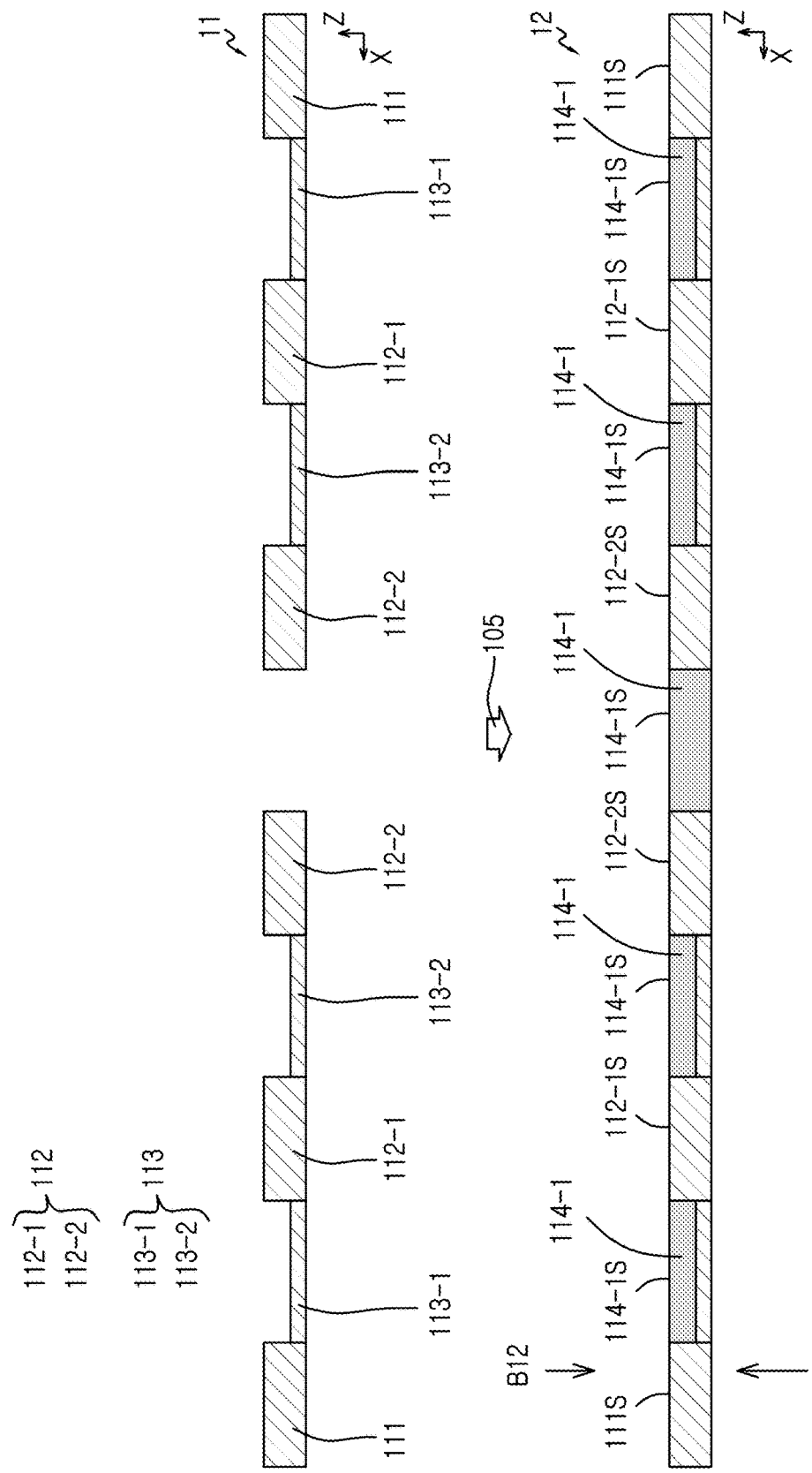

Referring to FIG. 1 and FIG. 2B, in operation 105, the 1st processed product 11 may be subjected to insert injection to form a 2nd processed product 12 consisting of a 1st non-conductive material 114-1 combined in the 1st processed product 11.

According to an exemplary embodiment, the 2nd processed product 12 may include a front side F12 and a back side B12 opposite to the front side F12.

According to an exemplary embodiment, in a top view of the back side B12 of the 2nd processed product 12, the 1st non-conductive material 114-1 may be formed inside the conductive plate 111, and may be disposed at least partially between the conductive plate 111 and the conductive coil 112 and/or between the plurality of turns 112-1 and 112-2 of the conductive coil 112. The 1st non-conductive material 114-1 may fill the areas where the base metal 10 were removed in the primary cutting. According to various exemplary embodiments, when viewed from the top of the back side B12 of the 2nd processed product 12, at least one part of the 1st non-conductive material 114-1 may cover the plurality of turns 112-1 and 112-2 of the conductive coil 112 (not shown).

According to an exemplary embodiment, the back side B12 of the 2nd processed product 12 may be formed by the conductive plate 111, the conductive coil 112, and the 1st non-conductive material 114-1.

According to an exemplary embodiment, one side 111S of the conductive plate 111, one side 112-1S or 112-2S of the conductive coil 112, and one side 114-1A of the 1st non-conductive material 114-1 may be coplanar as shown in FIG. 2B so as to form a smooth back side B12 of the 2nd processed product 12.

According to one or more exemplary embodiments, at least one part of the back side B12 of the 2nd processed product 12 may be flat or curved.

According to an exemplary embodiment, the one side 114-1S of the 1st non-conductive material 114-1 may not further protrude than the one side 111S of the conductive plate 111 in the front side F12 to the back side B12 direction.

For example, the one side 114-1S of the 1st non-conductive material 114-1 may be disposed at the same height as the one side 111S of the conductive plate 111.

According to an exemplary embodiment, the one side 114-1S of the 1st non-conductive material 114-1 may not further protrude than the one side 112-1S or 112-2S of the conductive coil 112 in the front side F12 to the back side B12 direction. For example, the one side 114-1S of the 1st non-conductive material 114-1 may be disposed at the same height as the one side 112S of the conductive coil 112.

Figure 2C:
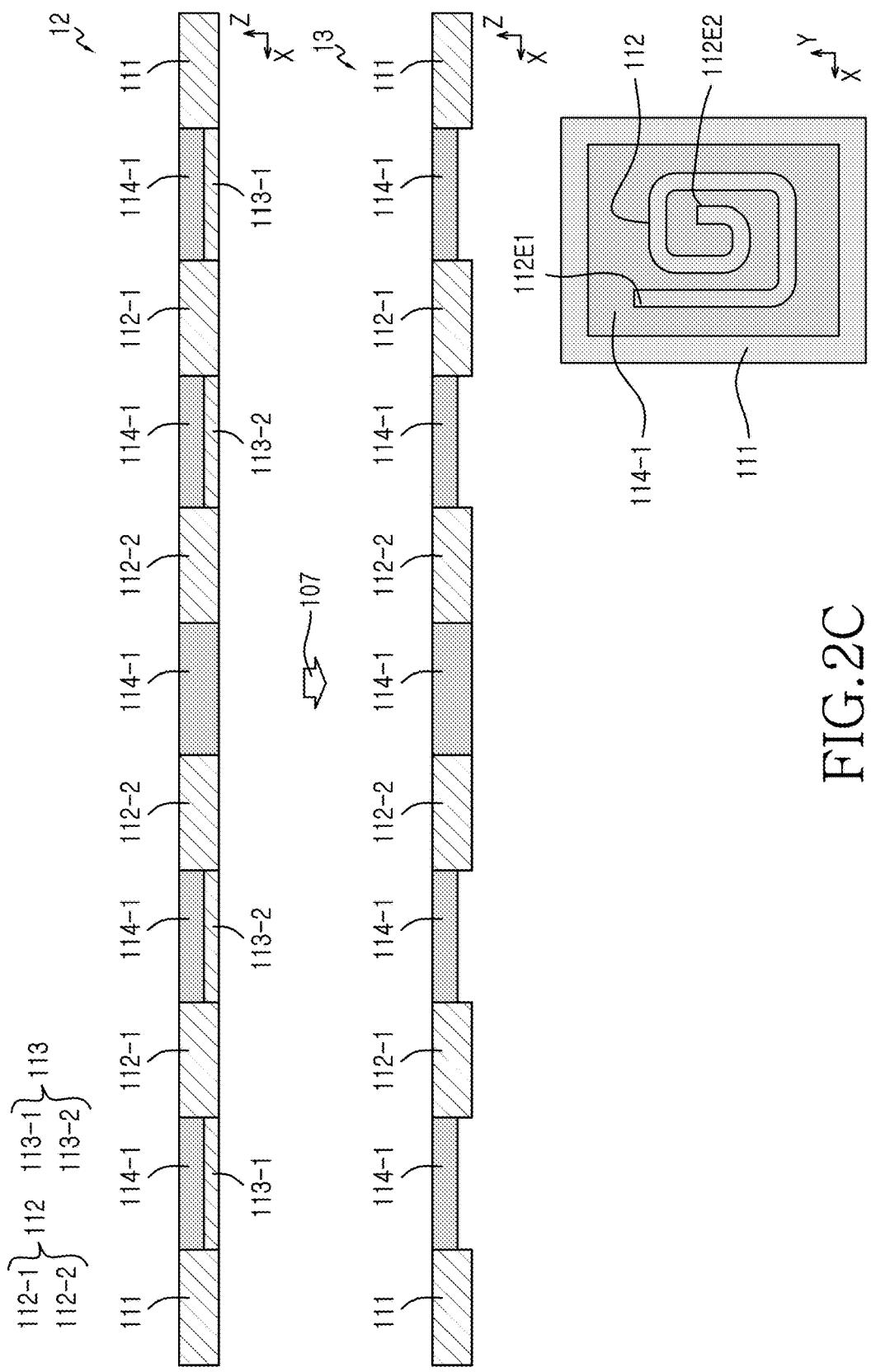
Figure 2D:
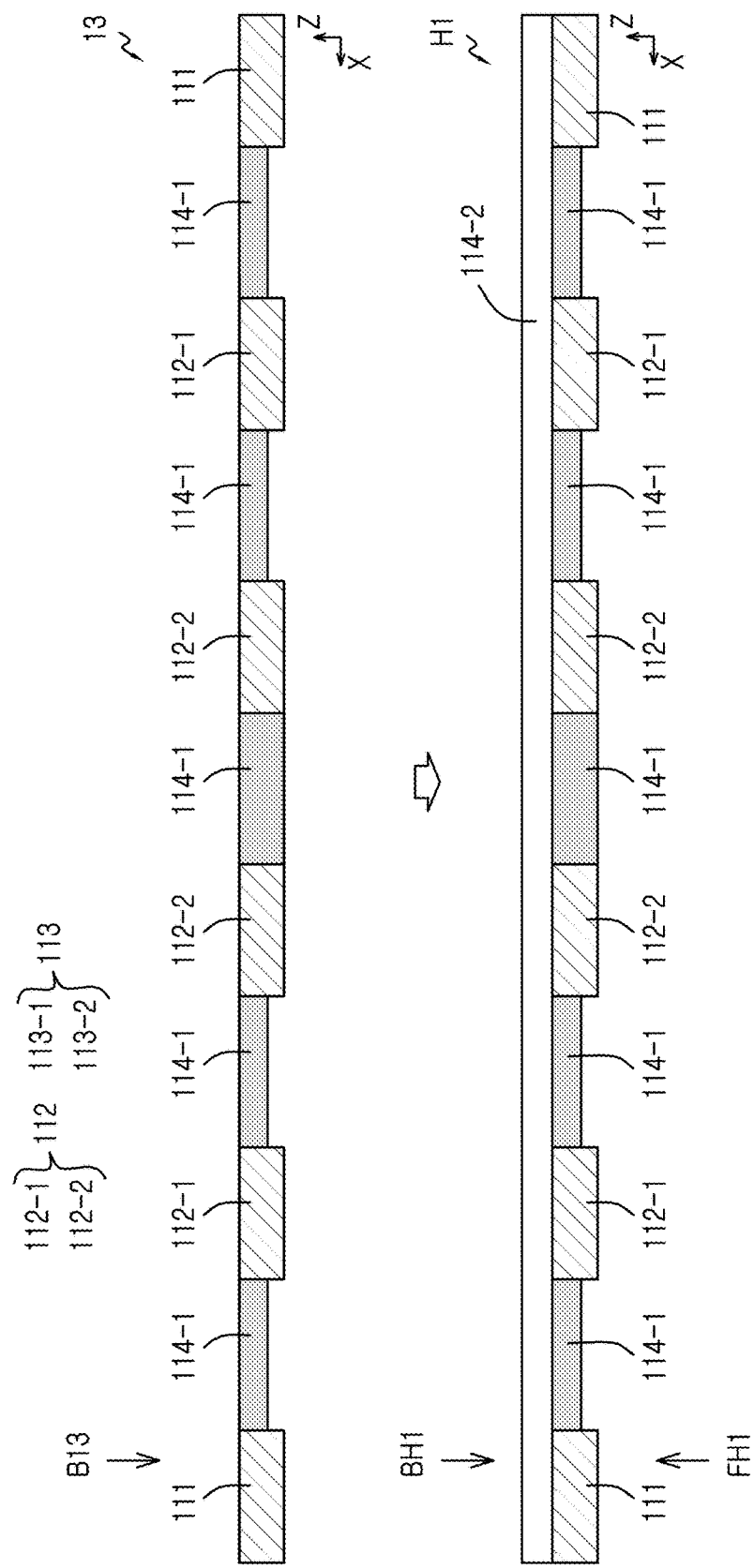
Figure 2E:
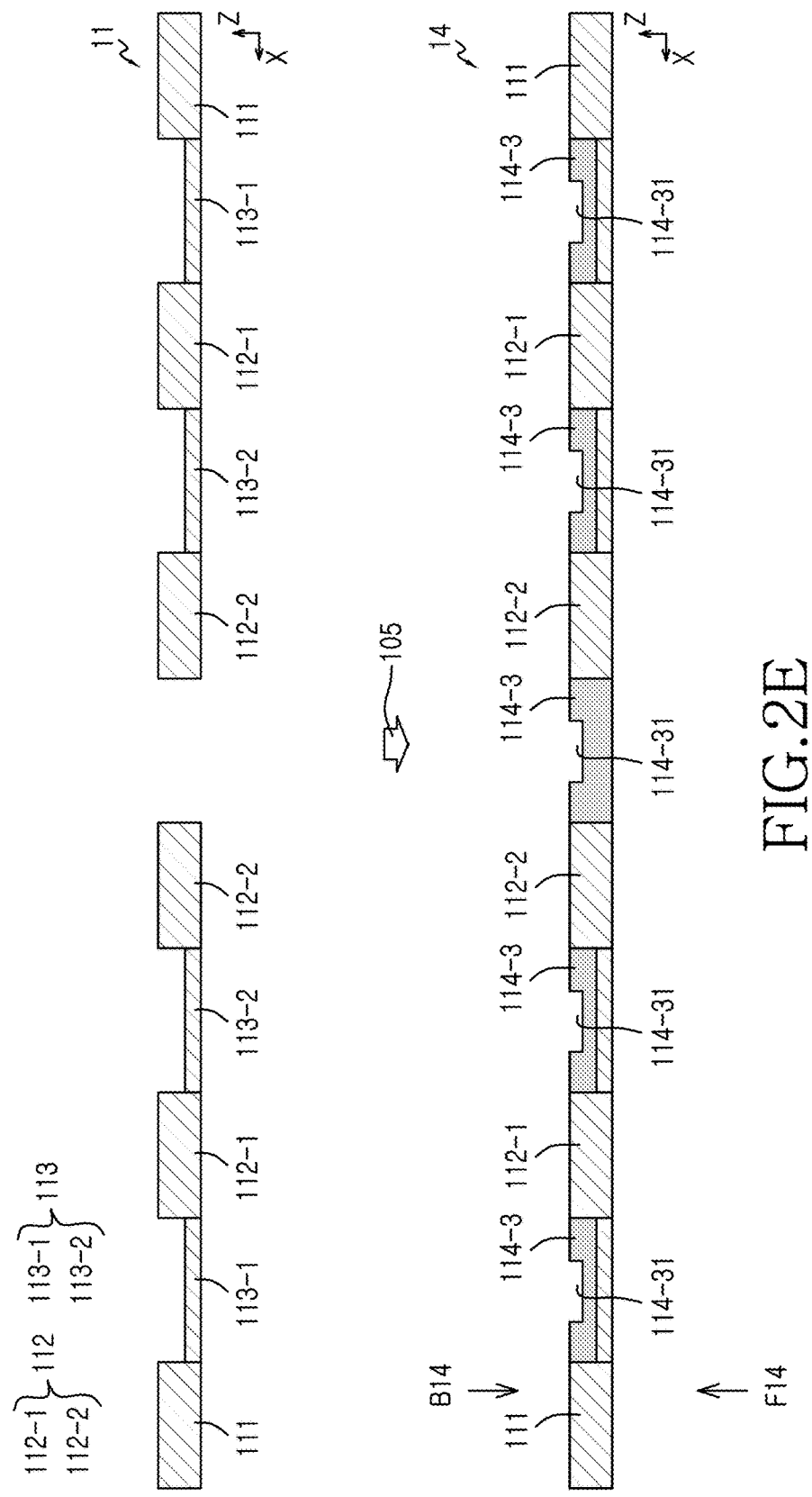
Figure 2G:
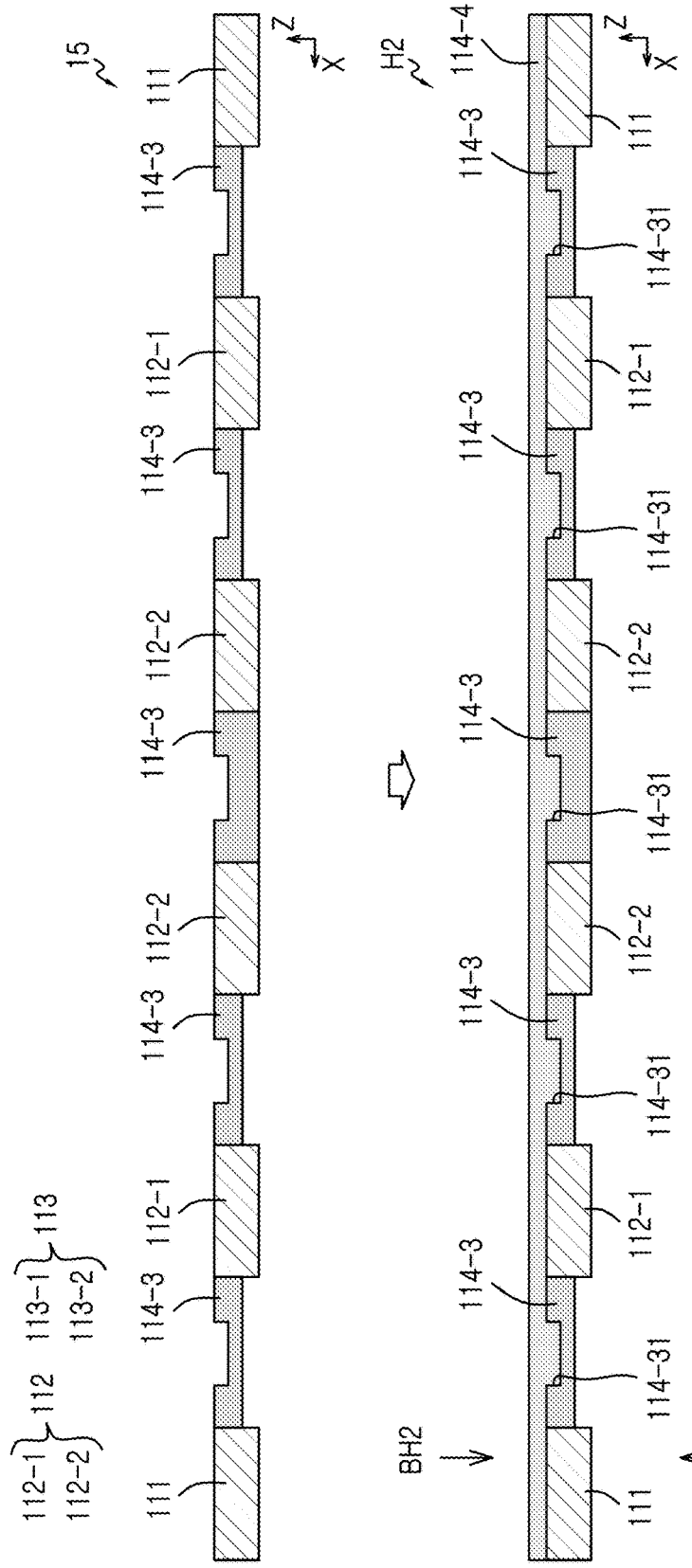
Figure 2H:
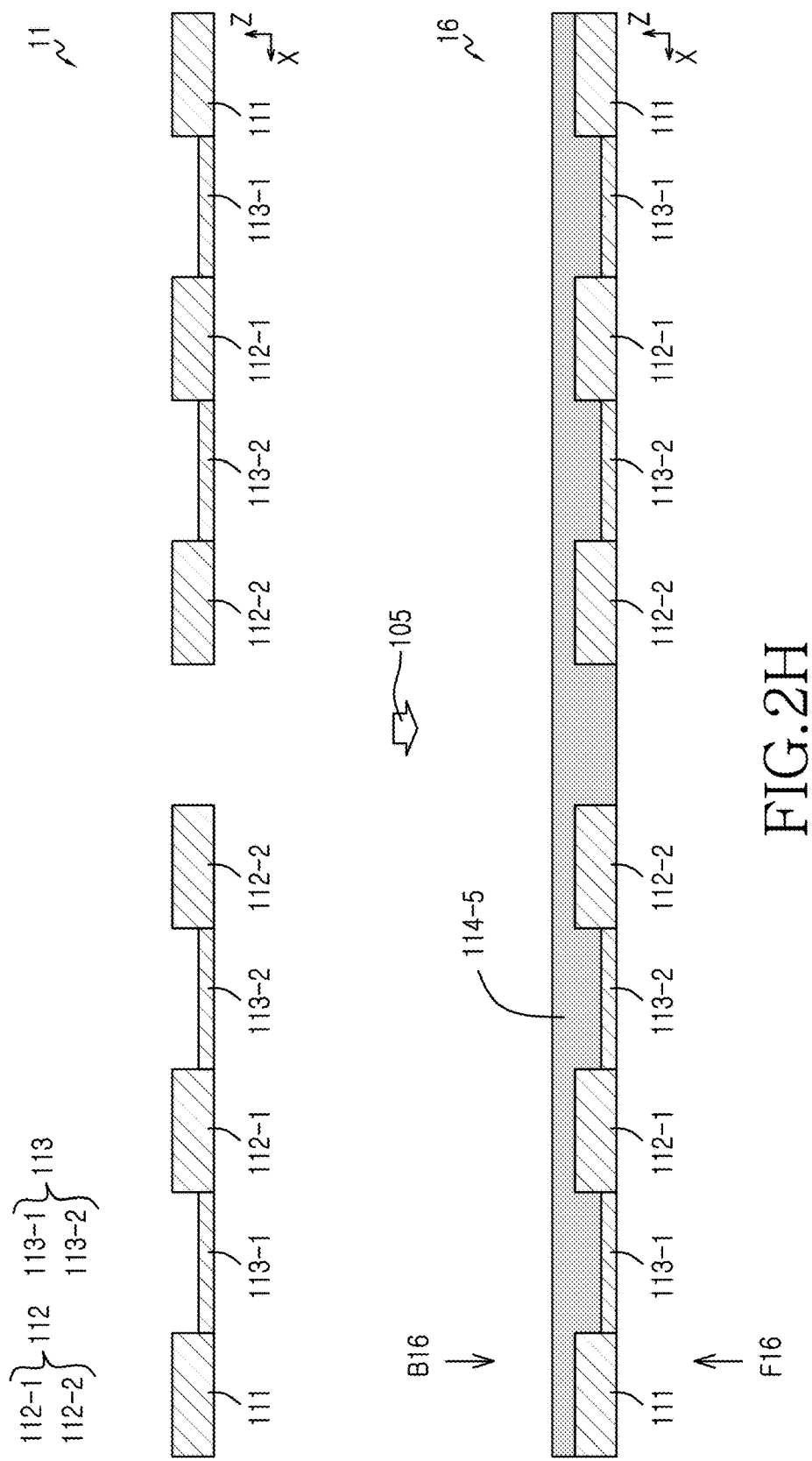
FIG. 2H and FIG. 2I illustrate a method of manufacturing a housing according to another exemplary embodiment of the present disclosure.
Figure 2I:
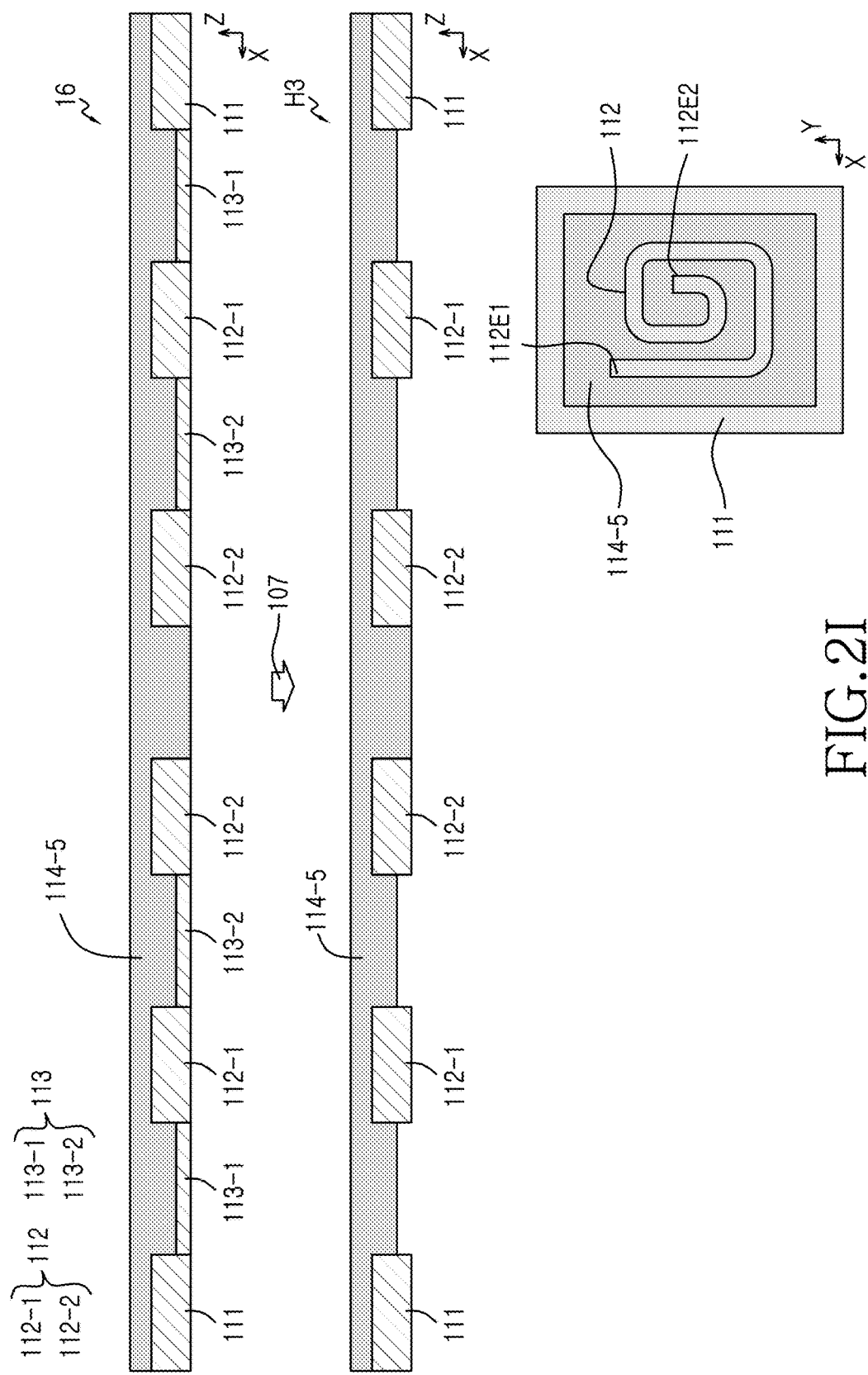

Referring to FIG. 1 and FIG. 2C, in operation 107, the plurality of bridges 113 may be removed from the 2nd processed product 12 by using a secondary cutting, and a 3rd processed product 13 may be formed. For example, if the at least one 1st bridge 113-1 is removed, the conductive coil 112 may be electrically separated or insulated from the conductive plate 111. For example, if the at least one 2nd bridge 113-2 is removed, a transmission line capable of moving current from one end 112E1 to the other end 112E2 of the conductive coil 112 may be formed.

According to one or more exemplary embodiments, the housing manufacturing method 1 may further include a post-processing operation. For example, referring to FIG. 2D, a 2nd non-conductive material 114-2 may be coupled to the 3rd processed product 13, and a housing H1 may be formed. The housing H1 may include a front side FH1 and a back side BH1 opposite to the front side FH1. According to an exemplary embodiment, the 2nd non-conductive material 114-2 may form at least one part of the back side BH1 of the housing H1. For example, in a top view of the back side BH1 of the housing H1, the 2nd non-conductive material 114-2 may cover the conductive plate 111, conductive coil 112, or non-conductive material 114-1 which forms a back side B13 of the 3rd processed product 13. The 2nd non-conductive material 114-2 may protect the housing H1 from the external environment.

According to one or more exemplary embodiments, the 2nd non-conductive material 114-2 may be formed of the same material as the 1st non-conductive material 114-1 or may be formed of a different material.

According to one or more exemplary embodiments, the 2nd non-conductive material 114-2 may include various types of materials. For example, the 2nd non-conductive material 114-2 may include glass or plastic.

According to one or more exemplary embodiments, the 2nd non-conductive material 114-2 may include a color, an image, or the like to customize the external appearance of the housing H1.

According to one or more exemplary embodiments, the housing may be formed with the aforementioned 1st processed product 11 in a different manner.

Referring to FIG. 1 and FIG. 2E, in operation 105, the 1st processed product 11 may be subjected to insert injection to form a 4th processed product 14 consisting of a 3rd non-conductive material 114-3 combined in the 1st processed product 11.

According to an exemplary embodiment, the 4th processed product 14 may include a front side F14 and a back side B14 opposite to the front side F14. In a top view of the back side B14 of the 4th processed product 14, the 3rd non-conductive material 114-3 may be formed inside the conductive plate 111, and may be disposed at least partially between the conductive plate 111 and the conductive coil 112 and/or between the plurality of turns 112-1 and 112-2 of the conductive coil 112. According to various exemplary embodiments, at least one part of the 3rd non-conductive material 114-3 may cover the plurality of turns 112-1 and 112-2 of the conductive coil 112.

According to an exemplary embodiment, the back side B14 of the 4th processed product 14 may be formed by the conductive plate 111, the conductive coil 112, and the 3rd non-conductive material 114-3.

According to an exemplary embodiment, the 3rd non-conductive material 114-3 may not further protrude than the conductive plate 111 in the front side F14 to the back side B14 direction.

According to an exemplary embodiment, the 3rd non-conductive material 114-3 may not further protrude than the conductive coil 112 in the front side F14 to the back side B14 direction.

According to an exemplary embodiment, the 3rd non-conductive material 114-3 may include at least one groove 114-31 which is concave towards the back side B14 of the 4th processed product 14, or towards the exterior side of the housing.

According to an exemplary embodiment, at least one part of the at least one groove 114-31 may be aligned on one virtual straight line (e.g., a straight line orthogonal to the back side B13 to the front side F13 direction or coplanar to the plane of the 4th processed product 14).

Referring to FIG. 1 and FIG. 2F, in operation 107, the plurality of bridges 113 may be removed from the 4th processed product 14 by using the secondary cutting, and a 5th processed product 15 may be formed. For example, if the at least one 1st bridge 113-1 is removed, the conductive coil 112 may be electrically separated from the conductive plate 111. For example, if the at least one 2nd bridge 113-2 is removed, a transmission line capable of moving current from one end 112E1 to the other end 112E2 of the conductive coil 112 may be formed.

According to one or more exemplary embodiments, the housing manufacturing method 1 may further include a post-processing operation. For example, referring to FIG. 2G, a 4th non-conductive material 114-4 may be coupled to the 5th processed product 15, and a housing H2 may be formed. The housing H2 may include a front side FH2 and a back side BH2 opposite to the front side FH2. The 4th non-conductive material 114-4 may form at least one part of the back side BH2 of the housing H2. According to an exemplary embodiment, in a top view of the back side BH2 of the housing H2, the non-conductive material 114-4 may cover at least one part of a back side B15 of the 5th processed product 15. For example, the 4th non-conductive material 114-4 may cover the conductive plate 111, conductive coil 112, or non-conductive material 114-3 which forms the back side B15 of the 5th processed product 15.

According to an exemplary embodiment, the 4th non-conductive material 114-4 may fill in the at least one groove 114-31 of the 3rd non-conductive material 114-3.

According to one or more exemplary embodiments, the 4th non-conductive material 114-4 may be formed of the same material as the 3rd non-conductive material 114-3 or may be formed of a different material.

According to one or more exemplary embodiments, the 4th non-conductive material 114-4 may protect the housing H2 from the external environment, or may include a color, an image, or the like to customize the exterior of the housing H2.

According to one or more exemplary embodiments, the housing may be formed with the aforementioned 1st processed product 11 in a different manner.

Referring to FIG. 1 and FIG. 2H, in operation 105, the 1st processed product 11 may be subjected to insert injection to form a 6th processed product 16 consisting of a 5th non-conductive material 114-5 coupled to the 1st processed product 11.

According to an exemplary embodiment, the 6th processed product 16 may include a front side F16 and a back side B16 opposite to the front side F16. The 5th non-conductive material 114-5 may form at least one part of the back side B16 of the 6th processed product 16.

According to an exemplary embodiment, in a top view of the back side B16 of the 6th processed product 16, the 5th non-conductive material 114-5 may cover the conductive plate 111, conductive coil 112, or bridge 114 which forms the back side B11 of the 1st processed product 11.

According to an exemplary embodiment, in the top view of the back side B16 of the 6th processed product 16, one part of the 5th non-conductive material 114-5 may be disposed between the conductive plate 111 and the conductive coil 112. In the top view of the back side B16 of the 6th processed product 16, the other part of the 5th non-conductive material 114-5 may be disposed between the plurality of turns 112-1 and 112-2 of the conductive coil 112.

Referring to FIG. 1 and FIG. 2I, in operation 107, the plurality of bridges 113 may be removed from the 6th processed product 16 by using the secondary cutting, and a housing H3 may be formed. For example, if the at least one 1st bridge 113-1 is removed, the conductive coil 112 may be electrically separated or insulated from the conductive plate 111. For example, if the at least one 2nd bridge 113-2 is removed, a transmission line capable of moving current from one end 112E1 to the other end 112E2 of the conductive coil 112 may be formed.

Figure 3:
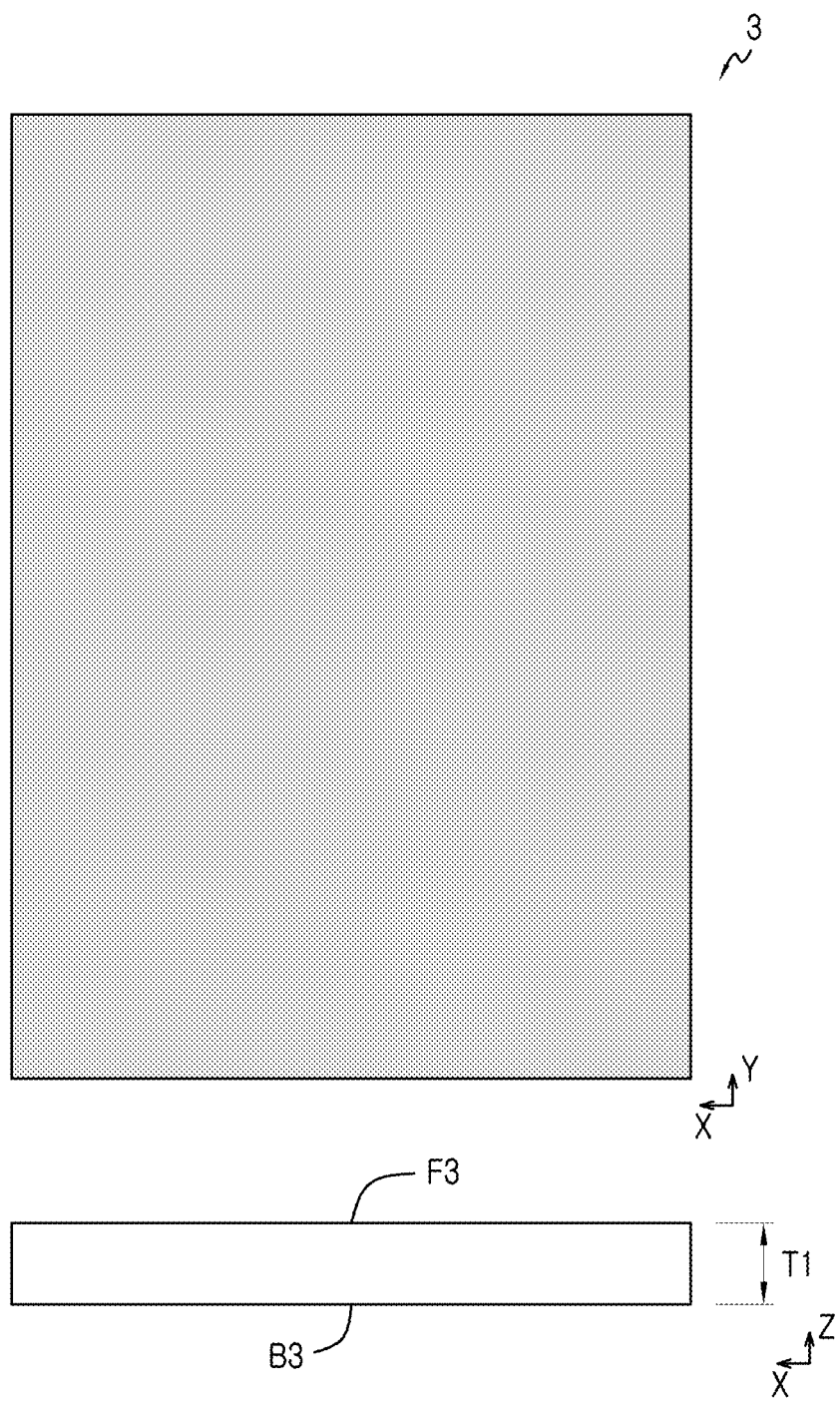
FIG. 3 illustrates a base metal according to an exemplary embodiment of the present disclosure.
Figure 4:
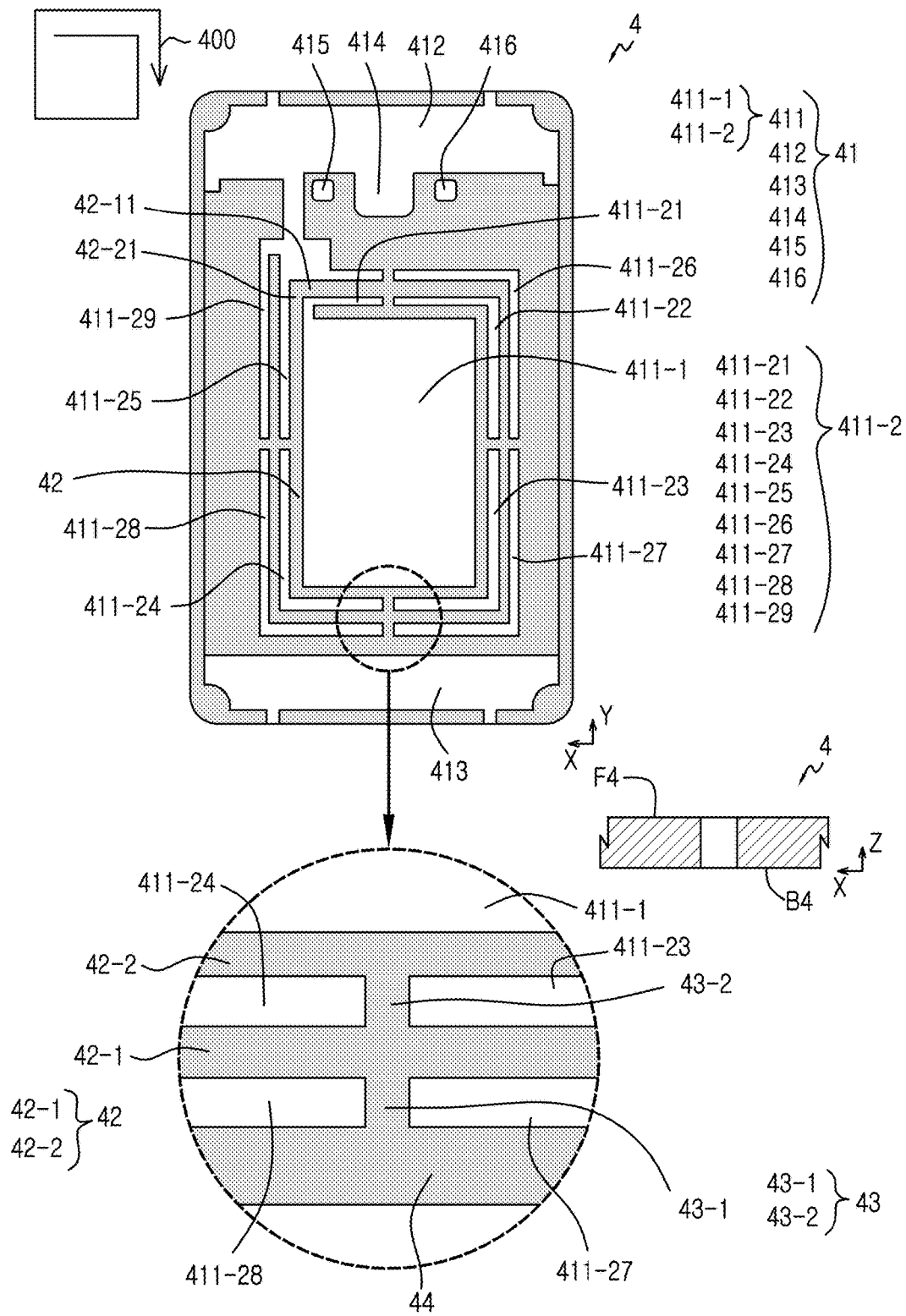
FIG. 4 illustrates a first housing member according to an exemplary embodiment of the present disclosure.
Figure 5A:
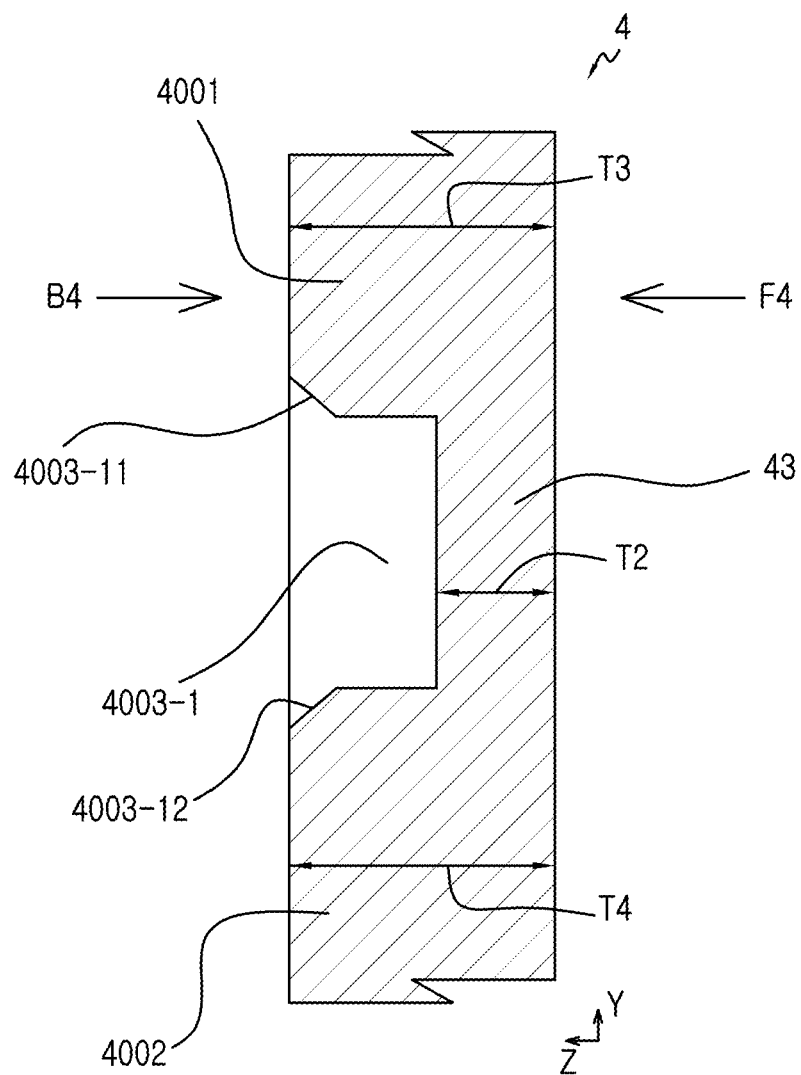
FIG. 5A, FIG. 5B, FIG. 5C and FIG. 5D are cross-sectional views illustrating one part of a first housing member according to an exemplary embodiment of the present disclosure.
Figure 5B:
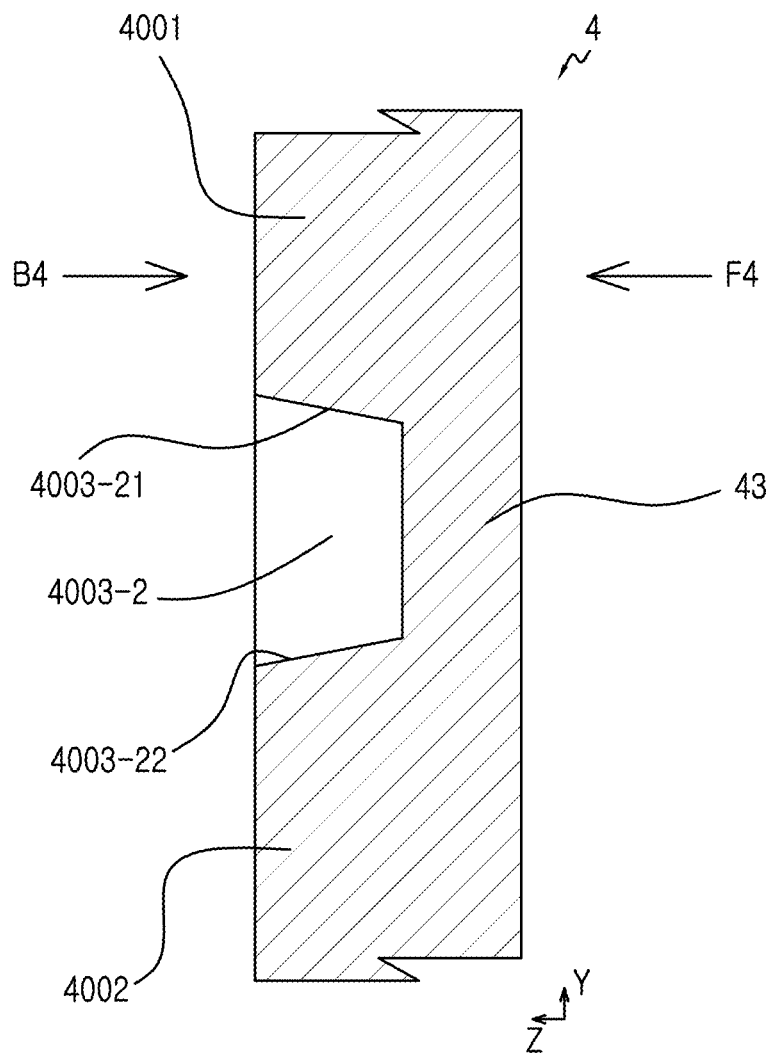
Figure 5C:
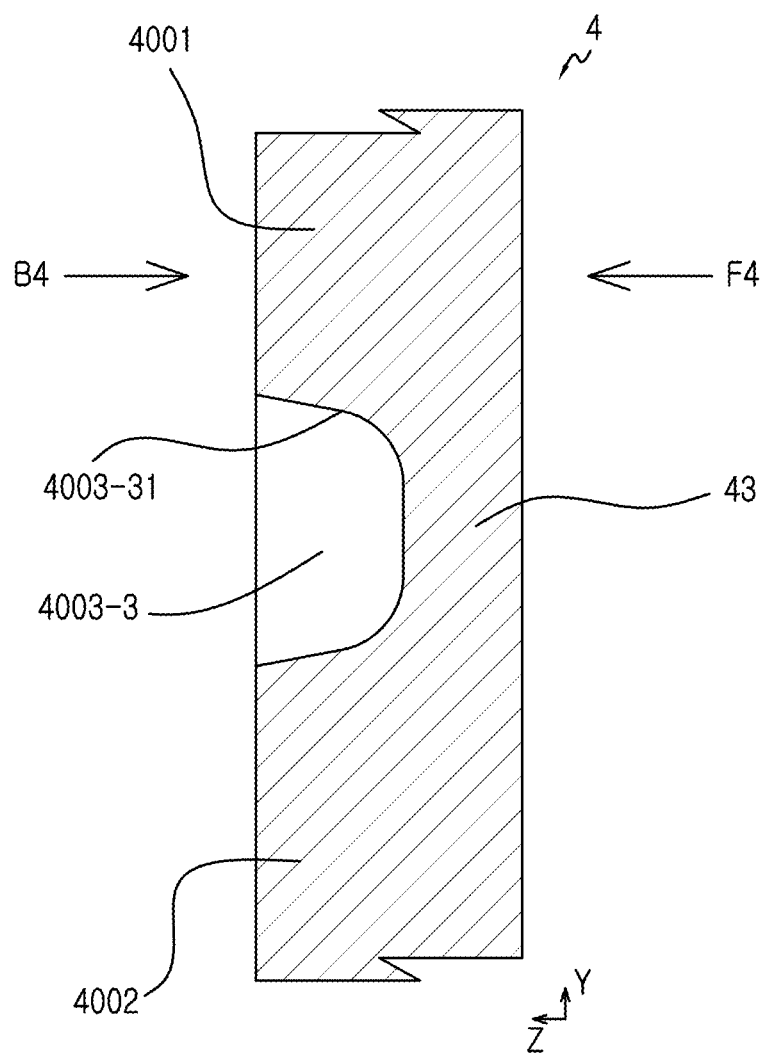
Figure 5D:
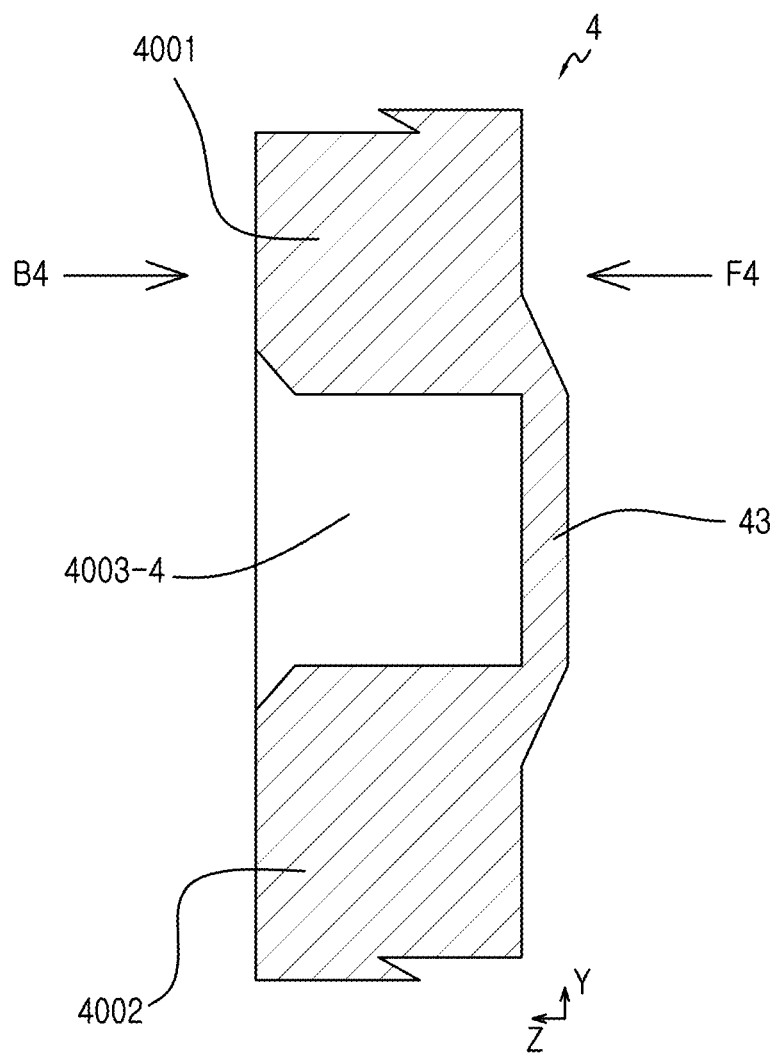
Figure 6:
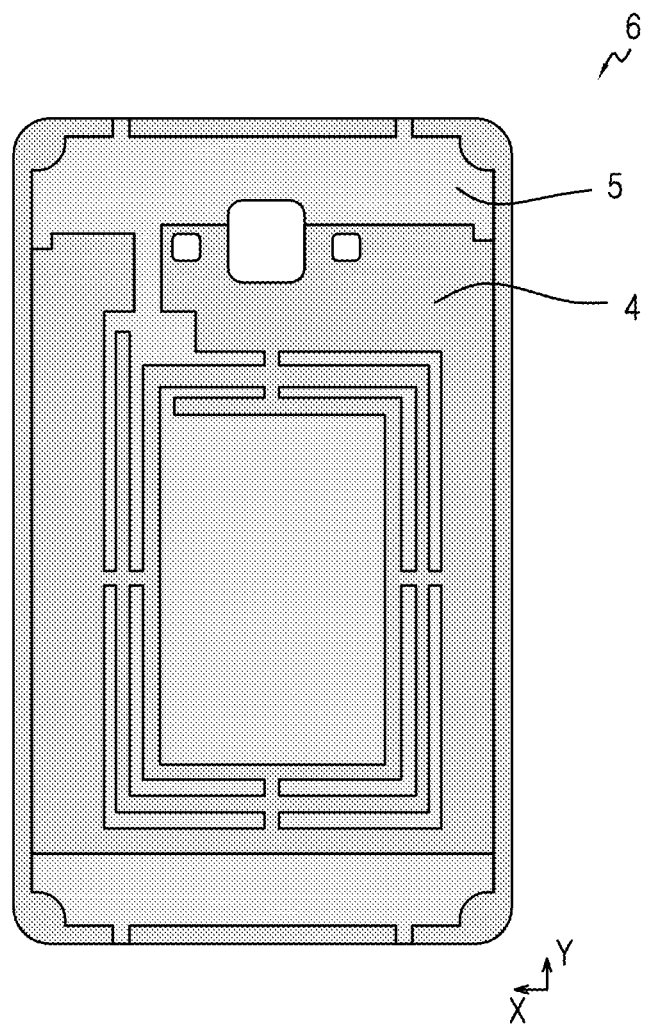
FIG. 6 illustrates a second housing member according to an exemplary embodiment of the present disclosure.
Figure 7:
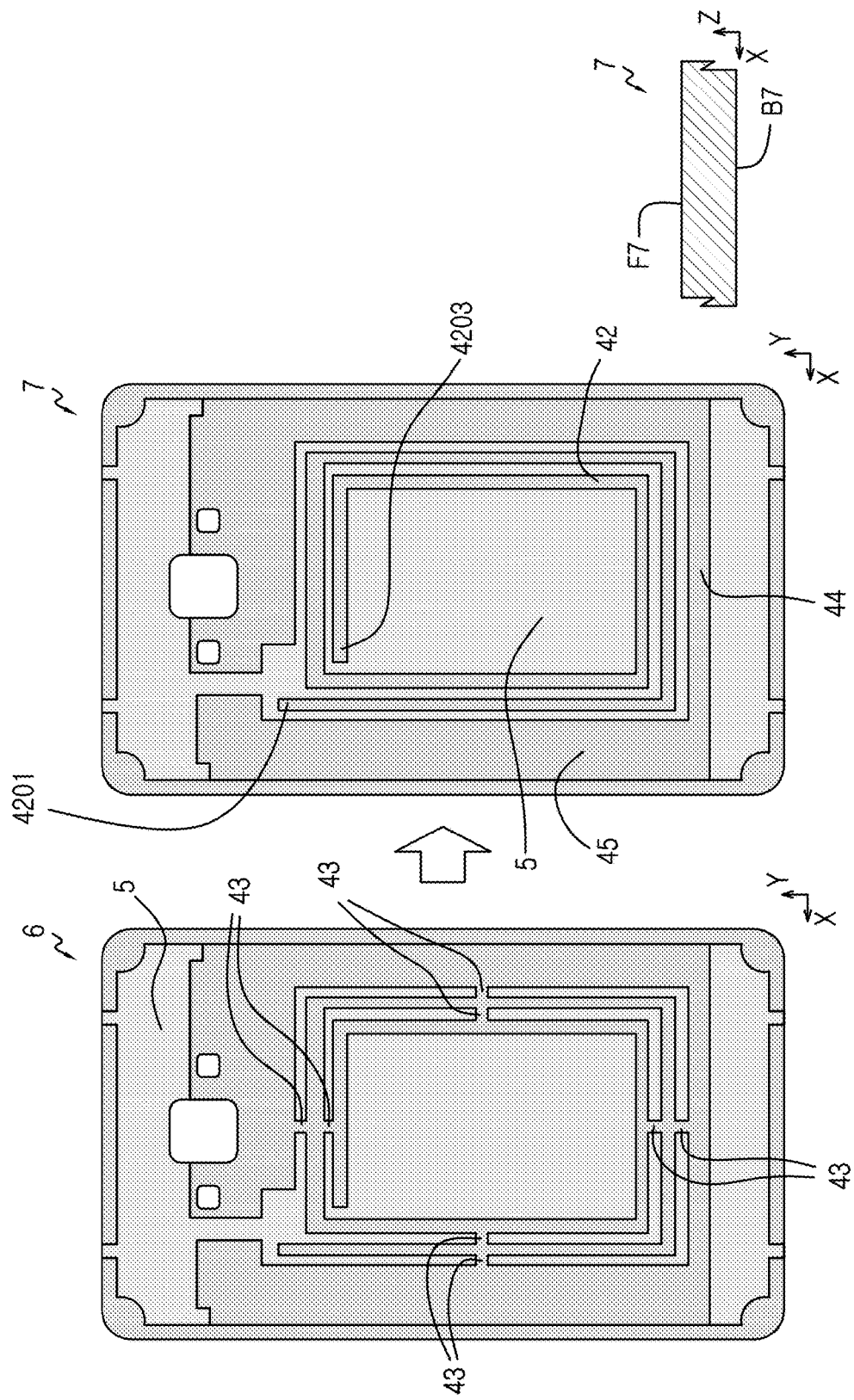
FIG. 7, FIG. 8 and FIG. 9 illustrate a housing of an electronic device according to an exemplary embodiment of the present disclosure.
Figure 8:
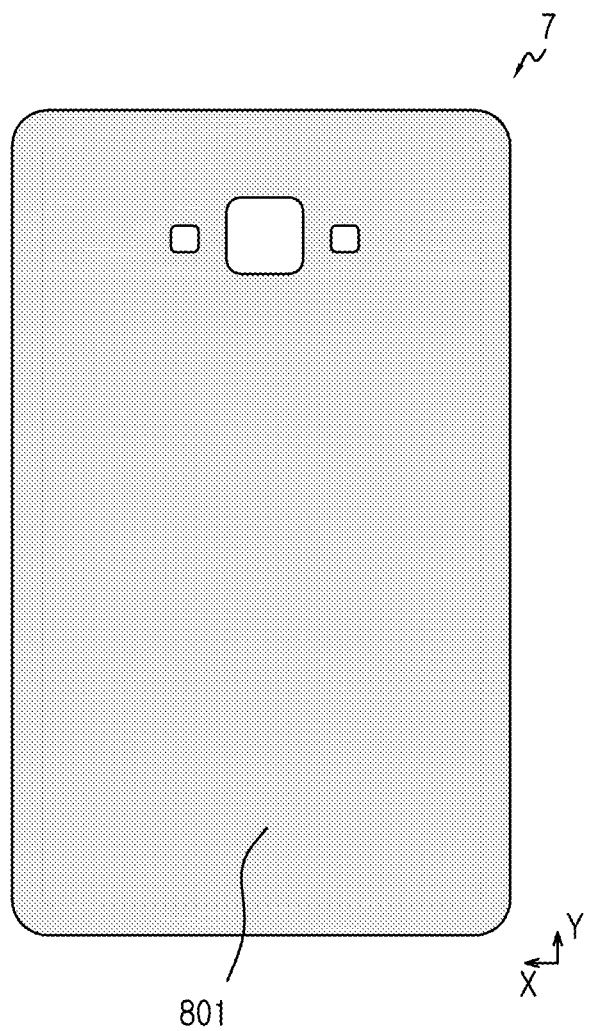
Figure 9:
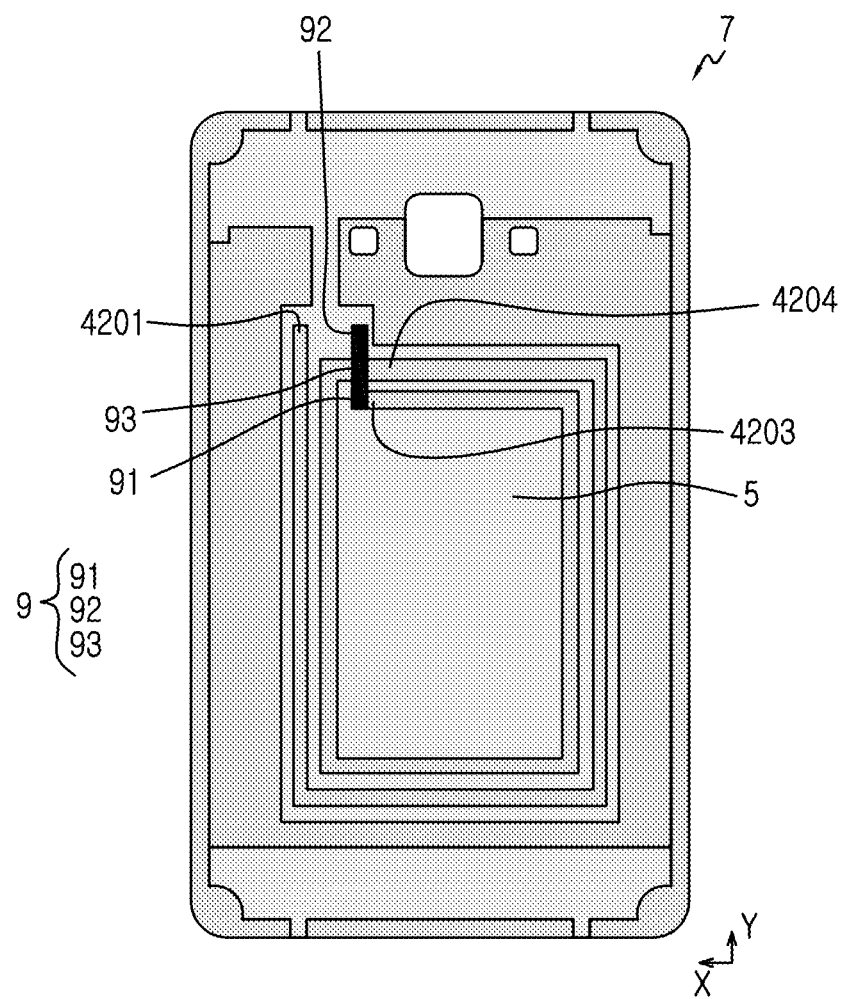

FIG. 3 to FIG. 9 are drawings for illustrating a method of manufacturing a housing according to an exemplary embodiment of the present disclosure. FIG. 3 illustrates a base metal 3 according to an exemplary embodiment of the present disclosure. FIG. 4 illustrates a 1st housing member 4 according to an exemplary embodiment of the present disclosure. FIG. 5A to FIG. 5D are cross-sectional views illustrating one part of the 1st housing member 4 according to an exemplary embodiment of the present disclosure. FIG. 6 illustrates a 2nd housing member 6 according to an exemplary embodiment of the present disclosure. FIG. 7 to FIG. 9 illustrate a housing 7 of an electronic device according to various exemplary embodiments of the present disclosure.

According to an exemplary embodiment, the housing may be a member used to form the exterior of at least one side of the electronic device. According to an exemplary embodiment, the housing may include a 1st side and a 2nd side opposite to the 1st side. The electronic device may include a display, and the display may be exposed through the 1st side. The housing described hereinafter may be a portion for forming the 2nd side, i.e. the back side, of the electronic device.

Referring to FIG. 3, the base metal 3 having electrical conductivity may be provided (see the first operation 101 in FIG. 1).

According to an exemplary embodiment, the base metal 3 may be casted. According to various exemplary embodiments, the base metal 3 may be not only formed by the casting but also various ways.

According to an exemplary embodiment, the base metal 3 may be made with a metallic material. For example, the base metal 3 may be an aluminum-magnesium alloy material.

According to various exemplary embodiments, the base metal 3 may include a plurality of portions. The plurality of portions may be made with different metallic materials. For example, the base metal 3 may have a structure in which heterogeneous metal layers are laminated together.

According to an exemplary embodiment, the base metal 3 may have an approximately plate shape having a thickness T1. For example, the base metal 3 may include a 1st side F3 and a 2nd side B3 opposite to the 1st side F3. Alternatively, the base metal 3 may have an approximately square or rectangular shape.

Referring to FIG. 4, at least one part of the base metal 3 may be removed by using a primary cutting (see the first operation 103 in FIG. 1). When the at least one portion is removed from the base metal 3, the 1st housing member 4 for forming one part of an end product (see a housing 7 in FIG. 9) may be formed.

According to an exemplary embodiment, the at least one part of the base metal 3 may be cut in the 1st side F3 to the 2nd side B3 direction. According to various exemplary embodiments, the at least one part of the base metal 3 may be cut in the 2nd side B3 to the 1st side F3 direction.

According to an exemplary embodiment, the 1st housing member 4 may have a 1st side F4 and a 2nd side B4 opposite to the 1st side F4. For example, the 1st side F4 and/or the 2nd side B4 may be flat, curved, or both in different portions.

According to an exemplary embodiment, the 1st housing member 4 may include a plurality of through-holes 41. The plurality of through-holes 41 may be an opening which from the 1st side F4 to the 2nd side B4. The plurality of through-holes 41 may be formed by removing the at least one part of the base metal 3 by the primary cutting.

According to an exemplary embodiment, the plurality of through-holes 41 may include a 1st through-hole 411, a 2nd through-hole 412, or a 3rd through-hole 413. For example, the 1st through-hole 411 may be disposed between the 2nd through-hole 412 and the 3rd through-hole 413.

According to an exemplary embodiment, the 1st through-hole 411 may include a center through-hole 411-1 and a plurality of peripheral through-holes 411-2 disposed around the center through-hole 411-1.

According to an exemplary embodiment, the center through-hole 411-1 may have an approximate square shape. Alternatively, the center through-hole 411-1 may have various shapes such as a circle, an ellipse, a triangle, or the like.

According to an exemplary embodiment, the plurality of peripheral through-holes 411-2 may be arranged around the center through-hole 411-1 in a spiral direction 400. For example, the center through-hole 411-1 may have a square shape, and the plurality of through-holes 411-2 may have a roughly square spiral shape. Alternatively, when the center through-hole 411-1 is constructed of various shapes, the plurality of peripheral through-holes 411-2 may also have various spiral shapes corresponding thereto.

According to an exemplary embodiment, the plurality of peripheral through-holes 411-2 may have shapes of long lines having a narrow width.

According to an exemplary embodiment, two peripheral through-holes (e.g., 411-21 and 411-22, 411-22 and 411-23, 411-23 and 411-24, 411-24 and 411-25, 411-25 and 411-26, 411-26 and 411-27, or 411-27 and 411-28) arranged in the spiral direction 400 may be separated from each other by bridges 43. For example, connection portions or bridges 43 may be disposed between the two adjacent peripheral through-holes (e.g., 411-21 and 411-22, 411-22 and 411-23, 411-23 and 411-24, 411-24 and 411-25, 411-25 and 411-26, 411-26 and 411-27, or 411-27 and 411-28). The bridges 43 may be portions of the base metal 3 which are not removed.

According to an exemplary embodiment, the through-holes, such as the 2nd through-hole 412 and/or the 3rd through-hole 413 may overlap with at least one component mounted inside the electronic device. For example, the 2nd through-hole 412 and/or the 3rd through-hole 413 may be disposed to overlap with an antenna radiator of the electronic device (e.g., a smart phone). Since the 2nd through-hole 412 and/or the 3rd through-hole 413 are openings in the base metal 3, this may be helpful to improve an antenna radiation performance of the antenna radiator of the electronic device.

According to various exemplary embodiments, the 1st housing member 4 may further include a through-hole 414 to cooperate with a camera module mounted on the electronic device. The camera module may be exposed through the through-hole 414.

According to various exemplary embodiments, the 1st housing member 4 may further include a through-hole 415 to cooperate with a camera flash mounted on the electronic device. Light generated from the flash may be emitted through the through-hole 415.

According to various exemplary embodiments, the 1st housing member 4 may further include a through-hole 416 to cooperate with a speaker module mounted on the electronic device. Sound generated from the speaker module may be outputted through the through-hole 416.

According to an exemplary embodiment, the 1st housing member 4 may have a metal pattern (or an antenna pattern) 42 formed by the 1st through-hole 411. For example, portions of the base metal 3 corresponding to the 1st through-hole 411 is removed to form the metal pattern 42.

According to an exemplary embodiment, the metal pattern 42 may have a shape of roughly a long line having a narrow width.

According to an exemplary embodiment, the metal pattern 42 may have a shape of roughly a spiral. For example, the metal pattern 42 may have a roughly square spiral shape. Alternatively, if the plurality of peripheral through-holes 411-2 are configured in various spiral shapes, the metal pattern 42 may also have various spiral shapes corresponding thereto.

According to an exemplary embodiment, the metal pattern 42 may include a 1st line pattern portion 42-1 disposed close to a peripheral area 44 of the through-hole 41 (hereinafter, a through-hole peripheral area). The 1st line pattern portion 42-1 may be separated from the through-hole peripheral area 44 by the peripheral through-hole 411-28.

According to an exemplary embodiment, the 1st housing member 4 may include at least one 1st bridge 43-1 for connecting between the 1st line pattern portion 42-1 and the through-hole peripheral area 44. The metal pattern 42 may be electrically coupled to the through-hole peripheral area 44 via the at least one 1st bridge 43-1.

According to an exemplary embodiment, the metal pattern 42 may be coupled to the 1st housing member 4 by the at least one 1st bridge 43-1. For example, the 1st bridge 43-1 may prevent the metal pattern 42 from being detached from the 1st housing 4 during the housing manufacturing process. If the at least one 1st bridge 43-1 is removed from the 1st housing member 4, the metal pattern 42 may be physically or electrically separated from the 1st housing member 4.

According to one or more exemplary embodiments, the 1st line pattern portion 42-1 of the metal pattern 42 may have a roughly square shape. The 1st line pattern portion 42-1 may include four straight line portions. For example, the 1st bridge 43-1 may be disposed between each of the four straight line portions and the through-hole peripheral area 44.

According to an exemplary embodiment, the metal pattern 42 may include a 2nd line pattern portion 42-2 connected to the 1st line pattern portion 42-1. One end 42-11 of the 1st line pattern portion 42-1 and one end 42-21 of the 2nd line pattern portion 42-2 are connected to each other, and the 2nd line pattern portion 42-2 (or an "internal line pattern portion") may be disposed to be surrounded by the 1st line pattern portion 42-1 (or an "external line pattern portion").

According to various exemplary embodiments, although not shown, the metal pattern 42 may additionally include an internal line pattern portion connected to the 2nd line pattern portion 42-2.

According to an exemplary embodiment, the 1st housing member 4 may include at least one 2nd bridge 43-2 for connecting between the 1st line pattern portion 42-1 and the 2nd line pattern portion 42-2. The 2nd bridge 43-2 may prevent the metal pattern 42 from being deformed during the housing manufacturing process. For example, the 2nd line pattern portion 42-2 may have, for example, a roughly long line shape, and may be deformed (e.g., shaken, snagged, or the like) by an external force. The at least one 2nd bridge 43-2 may be used to prevent the metal pattern 42 from being deformed.

According to one or more exemplary embodiments, the at least one 2nd bridge 43-2 may be disposed close to the 1st bridge 43-1. Alternatively, the at least one 2nd bridge 43-2 may be disposed to be separated from the 1st bridge 43-1.

According to one or more exemplary embodiments, the plurality of bridges 43 may allow the metal pattern 42 to be less deformed by the external force. For example, the metal pattern 42 may be designed to be generally flat or co-planar with the base metal 3. The plurality of bridges 43 may help maintain of the flatness of the metal pattern 42.

According to various exemplary embodiments, the first operation 101 and the second operation 102 of FIG. 1 may be replaced with a die casting. That is, instead of carving the metal pattern 42 in the base metal 3 by removing portions of the base metal 3. A base metal having a metal pattern 42 may be casted using a correspondingly shaped die.

Referring to FIG. 5A to FIG. 5D, the 1st housing member 4 may include the plurality of bridges 43. According to an exemplary embodiment, the plurality of bridges 43 may connect between a 1st portion 4001 and 2nd portion 4002 of the 1st housing member 4. For example, the 1st portion 4001 may be the through-hole peripheral area 44, and the 2nd portion 4002 may be one portion (e.g., the 1st line pattern portion 42-1) of the metal pattern 42. Alternatively, the 1st portion 4001 may be the 1st line pattern portion 42-1 of the metal pattern 42, and the 2nd portion 4002 may be the 2nd line pattern portion 42-2 of the metal pattern 42.

According to an exemplary embodiment, a thickness T2 of the plurality of bridges 43 may be thinner than a thickness T3 of the 1st portion 4001 and/or a thickness T4 of the 2nd portion 4002. For example, the plurality of bridges 43 have be relatively thin and thus more easily removed.

According to an exemplary embodiment, the 1st housing member 4 may include grooves 4003-1, 4003-2, 4003-3, and 4003-4 formed by the 1st portion 4001, the 2nd portion 4002, and the plurality of bridges 43. For example, when the 1st housing member 4 is subjected to insert injection, at least one part of the 2nd side B4 of the 1st housing member 4 may be coated by a plastic molten resin. The plastic molten resin may fill in the grooves 4003-1, 4003-2, 4003-3, and 4003-3 of the 2nd side B4.

Referring to FIG. 5A, the groove 4003-1 according to an exemplary embodiment may have an approximate square cross-sectional shape. The portion of the groove 4003-1 facing the 2nd side B4 may include an inclined side 4003-11 or 4003-12 or a curved side (not shown). For example, the inclined side 4003-11 or 4003-12 or the curved side may allow the plastic molten resin to be able to smoothly move inside the groove 4003-1 when the insert injection is performed.

Referring to FIG. 5B, the groove 4003-2 according to an exemplary embodiment may have an approximate trapezoidal cross-sectional shape. For example, inclined sides 4003-21 and 4003-22 having the trapezoidal cross-sectional shapes that may allow the plastic molten resin to be able to smoothly move inside the groove 4003-2 when the insert injection is performed.

Referring to FIG. 5C, the groove 4003-3 according to an exemplary embodiment may include a curved side 4003-31. For example, Assuming that an inner corner of the groove 4003-3 is an edge (not shown), it may be difficult for the plastic molten resin to be fully filled in an edge space when performing the insert injection. The curved side 4003-31 may facilitate the plastic molten resin to be fully filled inside the groove 4003-3.

Referring to FIG. 5D, the plurality of bridges 43 according to an exemplary embodiment may protrude from the 1st side F4.

According to an exemplary embodiment, the primary cutting may be performed by using Computer Numerical Control (CNC).

Referring to FIG. 6, the 1st housing member 4 may be placed inside a mold, and a non-conductive member 5 constituting another part of the housing may be formed through insert injection onto the housing member 4. When the non-conductive member 5 (e.g., plastic) is coupled to the 1st housing member 4, the 2nd housing member 6 may be formed.

According to an exemplary embodiment, the non-conductive member 5 may coat a 2nd side (e.g., B4 of FIG. 4) of the 1st housing member 4.

According to an exemplary embodiment, a 1st side (e.g., F4 of FIG. 4) of the 1st housing member 4 may be exposed in the 2nd housing member 6.

According to an exemplary embodiment, to form the non-conductive member 5, a molten resin may be filled in the plurality of through-holes 41 of the 1st housing member 4 when the insert injection is performed.

According to one or more exemplary embodiments, the non-conductive member 5 may made of various materials such as polyethylene, polycarbonate, polypropylene, or the like.

Referring to FIG. 7, the plurality of bridges 43 may be removed from the 2nd housing member 6 by using a secondary cutting, and the housing 7 of the electronic device may be formed. When the plurality of bridges 43 are removed from the 1st housing member (e.g., the 1st housing member 4 of FIG. 4), the metal pattern 42 is insulated from the conductive plate 45.

According to an exemplary embodiment, when the plurality of bridges 43 are removed, the metal pattern 42 and the conductive plate 45 are physically coupled together by the non-conductive member 5. Thus, the metal pattern 42 is not be separated from the 2nd housing member 6.

According to an exemplary embodiment, when the plurality of bridges 43 are removed, the metal pattern 42 may not be electrified on the through-hole peripheral area 44. For example, the metal pattern 42 may be disposed on the non-conductive member 5, and may be physically separated from the through-hole peripheral area 44 of the 1st housing member 4. As described above, the metal pattern 42 may have a line pattern having a roughly long spiral shape with a narrow width.

According to an exemplary embodiment, the metal pattern 42 may have a conductive coil shape (hereinafter, a conductive coil) including a plurality of turns. As illustrated, the conductive coil 42 may be a single coil having a plurality of turns.

According to an exemplary embodiment, the non-conductive member 5 may be at least partially disposed between the conductive plate 45 and the conductive coil 42 and/or between the plurality of turns of the conductive coil 42.

According to an exemplary embodiment, the housing 7 may include a 1st side F7 and a 2nd side B7 opposite to the 1st side F7. The 1st side F7 of the housing 7 may be disposed between a display of the electronic device (not shown) and the 2nd side B7. The 2nd side B7 of the housing may form at least one part of the exterior of the electronic device.

According to an exemplary embodiment, the non-conductive member 5 may include a 2nd non-conductive material (not shown) which covers the conductive plate 45, the conductive coil 42, and the 1st non-conductive material and which forms at least one part of the 2nd side B7 of the housing 7. For example, the 2nd non-conductive material may form at least one part of the exterior of the electronic device.

According to an exemplary embodiment, the 1st non-conductive material may include at least one groove which is concave towards the 2nd side B7.

According to an exemplary embodiment, at least one part of the at least one groove may be aligned on one virtual straight line (e.g., a straight line orthogonal to the direction from the 2nd side B7 to the 1st side F7).

According to an exemplary embodiment, the 2nd non-conductive material may be configured to fill at least one groove of the 1st non-conductive material.

According to an exemplary embodiment, the conductive coil 42 may include a 1st end 4201 and a 2nd end 4203.

According to an exemplary embodiment, the housing 7 may be detachable from the electronic device. When the housing 7 is coupled to the electronic device, the 1st end 4201 may be electrically connected to a feeding portion of a Printed Circuit Board (PCB) (not shown) mounted in the electronic device. Alternatively, the 2nd end 4203 may be electrically connected to a ground portion (not shown) of the PCB mounted in the electronic device. Current from the PCB may flow into the conductive coil 42 through the 1st end 4201. The current may circulate along the conductive coil 42 and flow into the ground portion of the PCB through the 2nd end 4203, and a transmission line capable of transmitting/receiving a wireless electromagnetic waves may be formed by the conductive coil 42.

According to an exemplary embodiment, the PCB may include a communication circuit (not shown) for supporting various types of communication. For example, the communication circuit may be electrically connected to the conductive coil 42, and may support various types of communication by using the conductive coil 42.

According to one or more exemplary embodiments, the conductive coil 42 may support near-distance communication. For example, the near-distance communication may include at least one of Wireless Fidelity (WiFi), Bluetooth, Near Field Communication (NFC), Global Navigation Satellite System (GNSS), or the like. According to a usage region, a bandwidth, or the like, the GNSS may include at least one of, for example, Global Positioning System (GPS), Global Navigation Satellite System (Glonass), Beidou navigation satellite system (hereinafter, "Beidou"), and Galileo, the European global satellite-based navigation system.

According to one or more exemplary embodiment, the conductive coil 42 may support magnetic signal (MST) transmission/reception.

According to one or more exemplary embodiments, the conductive coil 42 may support cellular communication.

According to one or more exemplary embodiments, the PCB may include a wireless charging circuit (not shown) for supporting wireless charging. For example, the wireless charging circuit may be electrically connected to the conductive coil 42, and may receive power wirelessly from an external wireless charger by using the conductive coil 42.

Referring to FIG. 8, according to one or more exemplary embodiments of the present disclosure, the housing 7 may be additionally machined. For example, the surface of the housing 7 may be processed. According to an exemplary embodiment, a coating for anti-fingerprinting may be coated on a surface of the housing 7. Alternatively, a pattern 801 such as a text, a picture, or the like may be printed on the surface of the housing 7.

According to various exemplary embodiments, the post-processing may be performed in the third operation and the fourth operation. Alternatively, the post-processing may be performed after the fourth operation.

Referring to FIG. 9, the conductive coil 42 may be electrically coupled using the connector 9.

According to an exemplary embodiment, the PCB mounted on the electronic device may include a 1st contact and a 2nd contact (not shown) for electrically connecting to the 1st end 4201 and 2nd end 4203 of the conductive coil 42. For example, when the housing 7 is coupled to the electronic device, the 1st end 4201 of the conductive coil 42 may be electrically in contact with the 1st contact of the PCB. When the housing 7 is coupled to the electronic device, the 2nd end 4203 of the conductive coil 42 may be disposed to a location which is difficult to be electrically in contact with the 2nd contact of the PCB.

According to an exemplary embodiment, one portion 4204 of the conductive coil 42 may be disposed between the 1st end 4201 and the 2nd end 4203. The electric connector 9 may include a 1st end 91 and a 2nd end 92. The 1st end 91 may be electrically connected to the 2nd end 4203 of the conductive coil 42. The 2nd end 92 may be coupled to the non-conductive member 5 on the outer side of the portion 4204 of the conductive coil 42. The 2nd end 92 may be disposed close to the 1st end 4201 of the conductive coil 42.

According to an exemplary embodiment, the electric connector 9 may include a connection portion 93 for electrically connecting between the 1st end 91 and the 2nd end 92.

According to an exemplary embodiment, the connection portion 93 may be coated with a non-conductive material. For example, the connection portion 93 overlaps at least partially with the one portion 4204 of the conductive coil 42, but is coated with a non-conductive material, and thus may be insulated from the portion 4204 of the conductive coil 42.

According to an exemplary embodiment, the electric connector 9 may include a Flexible Printed Circuit Board (FPCB).

According to an exemplary embodiment, the electric connector 9 may be ultrasonically welded to the housing 6.

According to an exemplary embodiment, when the housing 7 is coupled to the electronic device, the 1st end 4201 (or the 1st contact) of the conductive coil 42 may be electrically in contact with the 1st contact of the PCB. When the housing 7 is coupled to the electronic device, the 2nd end 92 (or the 2nd contact) of the electric connector 9 may be electrically in contact with the 2nd contact of the PCB.

According to one or more exemplary embodiments, the 1st end 4201 of the conductive coil 42 may be an "antenna feeding contact." For example, the 1st end 4201 of the conductive coil 42 may be electrically connected to the feeding portion of the PCB mounted on the electronic device. The 2nd end 92 of the electric connector 9 may be an "antenna ground contact." For example, the 2nd end 92 of the electric connector 9 may be electrically connected to the ground portion of the PCB mounted on the electronic device, or vice versa.

According to various exemplary embodiments, the 1st end 4201 of the conductive coil 42 may be an 'antenna ground contact' electrically connected to the ground portion of the PCB mounted on the electronic device. Alternatively, the 2nd end 92 of the electric connection means 9 may be an 'antenna feeding contact' electrically connected to the feeding portion of the PCB mounted on the electronic device.

According to one or more exemplary embodiments, the connection portion 93 of the electric connector 9 may be used as an antenna radiator together with the conductive coil 42. For example, the connection portion 93 may have various patterned shapes.

According to one or more exemplary embodiments, a change of the contact location of the conductive coil 42 may be selectively employed when considering the arrangement of the 1st contact and the 2nd contact of the PCB.

Figure 10:
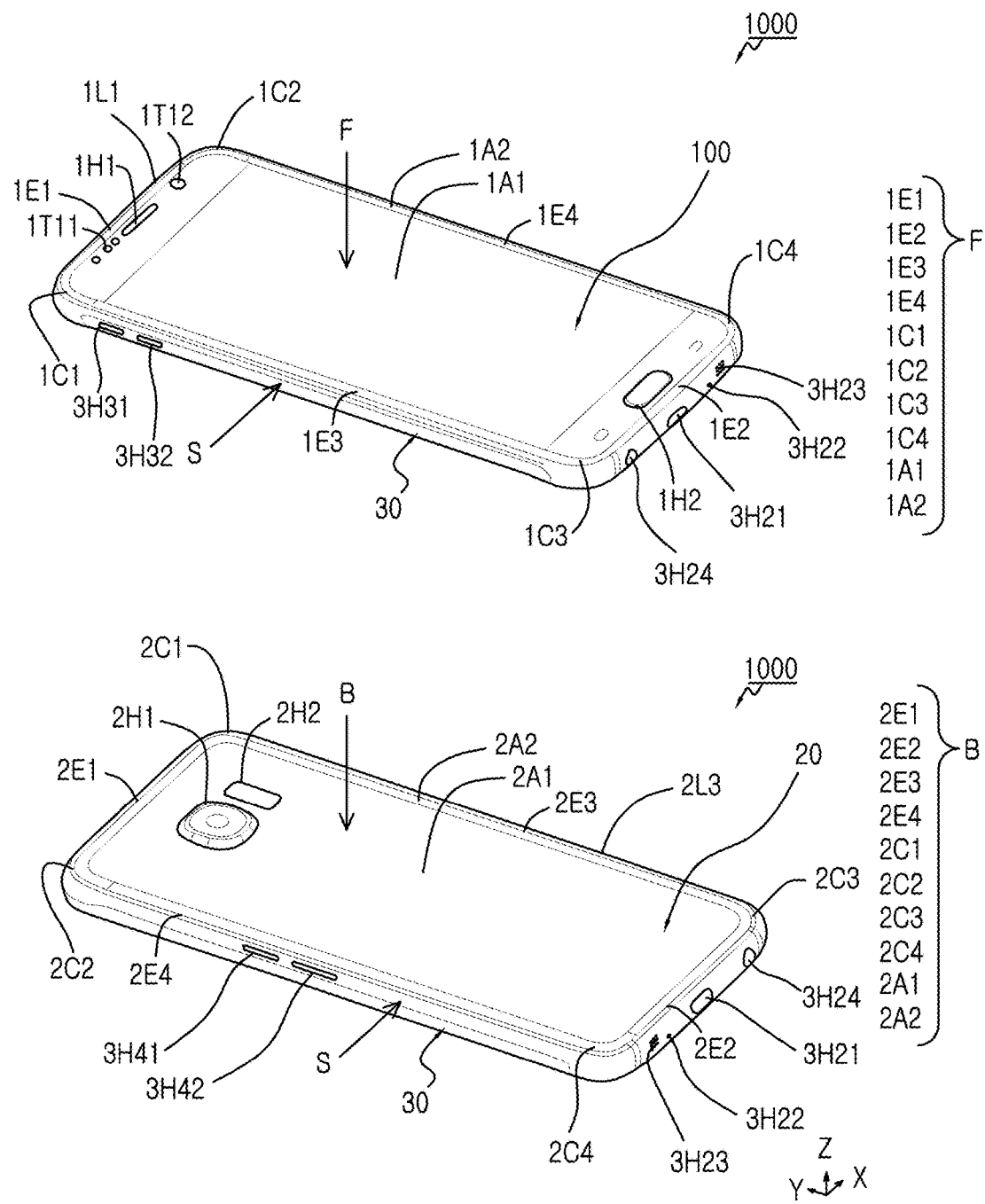
FIG. 10 is a perspective view of an electronic device according to an exemplary embodiment of the present disclosure.

FIG. 10 is a perspective view of an electronic device according to an exemplary embodiment of the present disclosure. In addition, FIG. 11 is a perspective view of an electronic device, viewed in various directions, according to an exemplary embodiment of the present disclosure.

Figure 11:
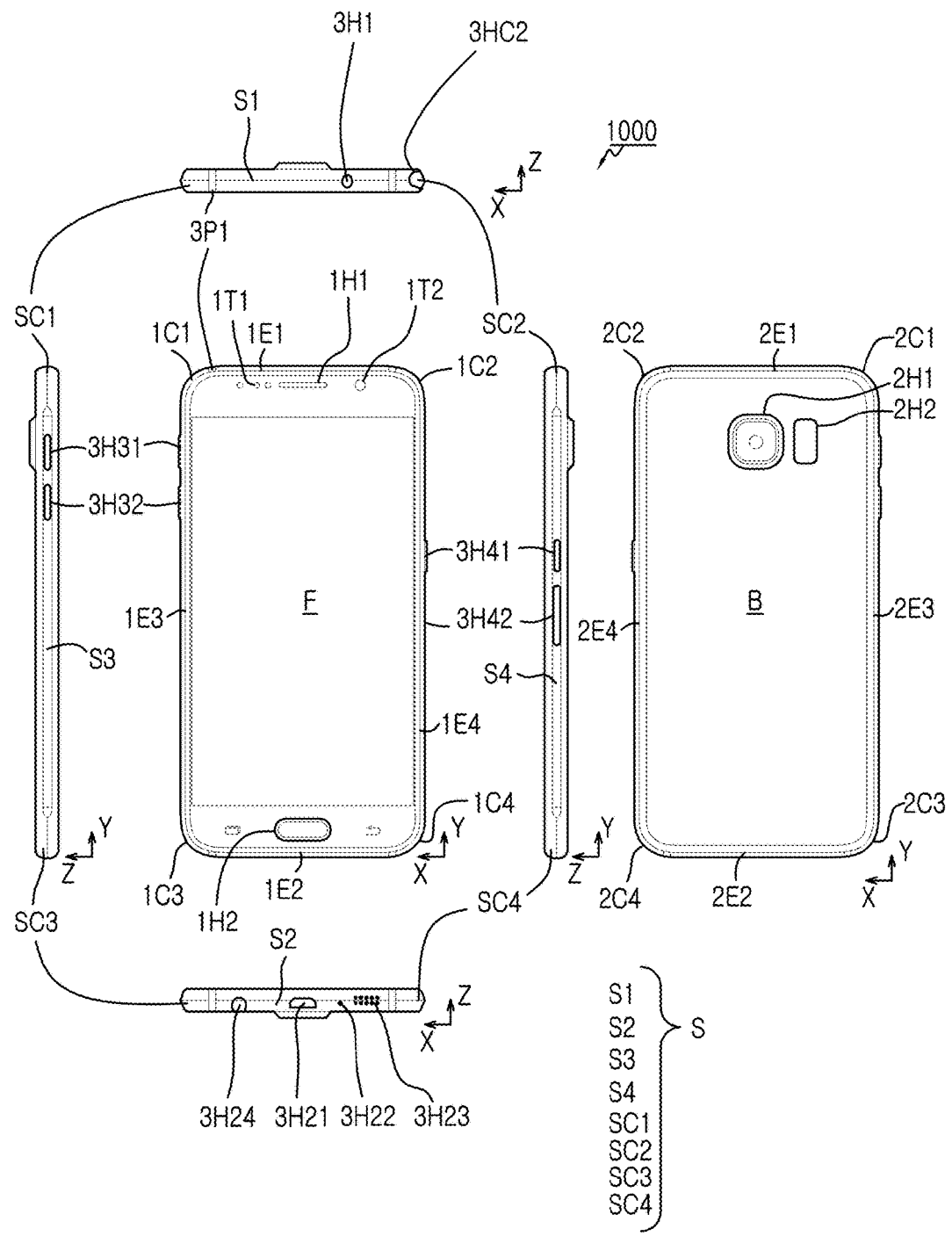
FIG. 11 is a perspective view of an electronic device, viewed in various directions, according to an exemplary embodiment of the present disclosure.

Referring to FIG. 10 and FIG. 11, according to an exemplary embodiment, the electronic device 1000 may have a roughly square or rectangular shape, and may include a front cover 100 for forming a front side F of the electronic device 1000 and a back cover 20 for forming a back side B of the electronic device 1000. The electronic device 1000 may include a bezel 30 which surrounds a space between the front cover 100 and the back cover 20. The electronic device 1000 may include a display included in a space formed by the back cover 20. Herein, the display may be exposed to the outside through the front cover 100.

According to an exemplary embodiment, the front cover 100 and/or the back cover 20 may be made of glass.

According to an exemplary embodiment, the bezel 30 may be made of a non-metallic or metallic material.

According to an exemplary embodiment, the front side F may include a 1st edge 1E1, a 2nd edge 1E2, a 3rd edge 1E3, and a 4th edge 1E4. The 1st edge 1E1 and the 2nd edge 1E2 may be disposed at opposite sides, and the 3rd edge 1E3 and the 4th edge 1E4 may be disposed at opposite sides. The 3rd edge 1E3 may connect one end of the 1st edge 1E1 and one end of the 2nd edge 1E2. The 4th edge 1E4 may connect the other end of the 1st edge 1E1 and the other end of the 2nd edge 1E2.

According to an exemplary embodiment, the 1st edge 1E1, the 2nd edge 1E2, the 3rd edge 1E3, and the 4th edge 1E4 may be straight or curved.

According to an exemplary embodiment, the front side F may include a 1st corner edge 1C1 in which the 1st edge 1E1 and the 3rd edge 1E3 are connected. The front side F may include a 2nd corner edge 1C2 in which the 1st edge 1E1 and the 4th edge 1E4 are connected. The front side F may include a 3rd corner edge 1C3 in which the 2nd edge 1E2 and the 3rd edge 1E3 are connected. The front side F may include a 4th corner edge 1C4 in which the 2nd edge 1E2 and the 4th edge 1E4 are connected.

According to an exemplary embodiment, the front side F may include a 1st corner edge 1C1 in which the 1st edge 1E1 and the 3rd edge 1E3 are connected. The front side F may include a 2nd corner edge 1C2 in which the 1st edge 1E1 and the 4th edge 1E4 are connected. The front side F may include a 3rd corner edge 1C3 in which the 2nd edge 1E2 and the 3rd edge 1E3 are connected. The front side F may include a 4th corner edge 1C4 in which the 2nd edge 1E2 and the 4th edge 1E4 are connected.

According to an exemplary embodiment, the front side F may include a center area 1A1 which roughly corresponds to a screen area of a display. The center area 1A1 may be flat or curved. In addition, the center area 1A1 may have a roughly square shape, and may be transparent such that an image of the display is externally visible.

According to an exemplary embodiment, the front side F may include an edge area 1A2 which surrounds the center area 1A1. The edge area 1A2 may have a roughly rectangular ring shape. The edge area 1A2 may be black. For example, the edge area 1A2 may have a color similar to that of the bezel 30, or may be a different color.

According to an exemplary embodiment, the edge area 1A2 may include an inclined side or a curved side.

According to an exemplary embodiment, the front cover 100 may include a through-hole 1H1 for supporting a speaker or receiver mounted on the electronic device 1000. Sound from the speaker or the receiver may be outputted to the outside through the through-hole 1H1.

According to an embodiment, the front cover 100 may include at least one of transparent areas 1T11 and 1T12 for supporting an optical-related component (e.g., an illumination sensor, an image sensor, etc.) mounted on the electronic device 1000. External light may be introduced to the optical-related components through the transparent areas 1T11 and 1T12.

According to an exemplary embodiment, the front cover 100 may include a through-hole 1H2 for cooperating with a button mounted on the electronic device 1010. The button may be exposed to the outside through the through-hole 1H2.

According to an exemplary embodiment, the back side F may include a 1st edge 2E1, a 2nd edge 2E2, a 3rd edge 2E3, and a 4th edge 2E4. The 1st edge 2E1 and the 2nd edge 2E2 may be disposed at opposite sides, and the 3rd edge 2E3 and the 4th edge 2E4 may be disposed at opposite sides. The 3rd edge 2E3 may connect one end of the 1st edge 2E1 and one end of the 2nd edge 2E2. In addition, the 4th edge 2E4 may connect the other end of the 1st edge 2E1 and the other end of the 2nd edge 2E2.

According to an exemplary embodiment, the 1st edge 2E1, the 2nd edge 2E2, the 3rd edge 2E3, and the 4th edge 2E4 may be straight or curved.

According to an exemplary embodiment, the back side B may include a 1st corner edge 2C1 in which the 1st edge 2E1 and the 3rd edge 2E3 are connected. The back side B may include a 2nd corner edge 2C2 in which the 1st edge 2E1 and the 4th edge 2E4 are connected. The back side B may include a 3rd corner edge 2C3 in which the 2nd edge 2E2 and the 3rd edge 2E3 are connected. Further, the back side B may include a 4th corner edge 2C4 in which the 2nd edge 2E2 and the 4th edge 2E4 are connected.

According to an exemplary embodiment, the back side B may include a center area 2A1 and an edge area 2A2 which surrounds the center area 2A1. The center area 2A1 may have a roughly square shape, and may be flat or curved. In addition, the edge area 2A2 may have a roughly rectangular ring shape.

According to an exemplary embodiment, the edge area 2A2 may include an inclined side or a curved side.

According to an exemplary embodiment, the back side B may be of a color similar to that of the bezel 30 or be a different color.

According to an exemplary embodiment, the back cover 20 may include a through-hole 2H1 for a camera mounted on the electronic device 1000. The camera may be exposed to the outside through the through-hole 2H1. The back cover 20 may include a through-hole or transparent area 2H2 for a flash mounted on the electronic device 1000. Light from the flash may be emitted to the outside through the through-hole or the transparent area 2H2.

According to an exemplary embodiment, the back cover 20 may be formed using the housing manufacturing method of FIG. 1. The back cover 20 may include a conductive coil (e.g., the conductive coil 42 of FIG. 7). For example, the conductive coil of the back cover 20 may support various types of communication. Alternatively, the conductive coil of the back cover 20 may support wireless charging.

According to an exemplary embodiment, the bezel 30 may form a lateral side S of the electronic device 1000. For example, the lateral side S may include a 1st connection side S1 on which the 1st edge 1E1 of the front side F and the 1st edge 2E1 of the back side B are connected. The lateral side S may include the 2nd edge 1E2 of the front side F and the 2nd edge 2E2 of the back side B are connected. The lateral side S may include a 3rd connection side S3 on which the 3rd edge 1E3 of the front side F and the 3rd edge 2E3 of the back side B are connected. In addition, the lateral side S may include a 4th connection side S4 on which the 4th edge 1E4 of the front side F and the 4th edge 2E4 of the back side B are connected.

According to an exemplary embodiment, the bezel 30 may include a 1st corner connection side SC1 on which the 1st corner edge 1C1 of the front side F and the 1st corner edge 2C1 of the back side B are connected. The bezel 30 may include a 2nd corner connection side SC2 on which the 2nd corner edge 1C2 of the front side F and the 2nd corner edge 2C2 of the back side B are connected. The bezel 30 may include a 3rd corner connection side SC3 on which the 3rd corner edge 1C3 of the front side F and the 3rd corner edge 2C3 of the back side B are connected. In addition, the bezel 30 may include a 4th corner connection side SC4 on which the 4th corner edge 1C4 of the front side F and the 4th corner edge 2C4 of the back side B are connected.

According to an exemplary embodiment, at least one part of the lateral side S of the bezel 30 may include a curved side.

According to an exemplary embodiment, the bezel 30 may include a through-hole 3H1 for cooperating with an ear jack mounted on the electronic device 1000. An ear plug may be connected to the ear jack through the through-hole 3H1. The through-hole 3H1 may be disposed to the 1st connection side 51. Alternatively, according to another exemplary embodiment, an Infrared Ray (IR) sensor may be installed in replacement of the through-hole 3H1.

According to an exemplary embodiment, the bezel 30 may include a through-hole 3H22 for cooperating with a microphone mounted on the electronic device 1000. External sound may be detected by the microphone through the through-hole 3H22. The through-hole 3H22 may be disposed to the 2nd connection side S2.

According to an exemplary embodiment, the bezel 30 may include a through-hole 3H23 for cooperating with a speaker mounted on the electronic device 1000. Sound from the speaker may be outputted to the outside through the through-hole 3H23. The through-hole 3H23 may be disposed to the 2nd connection side S2.

According to an exemplary embodiment, the bezel 30 may include a through-hole 3H24 for cooperating with a stylus detachable from the electronic device 1000. The stylus may be inserted to an inner space through the through-hole 3H24, or may be separated from the inner space through the through-hole 3H24. The through-hole 3H24 may be disposed to the 2nd connection side S2.

According to an exemplary embodiment, the bezel 30 may include a plurality of through-holes 3H31 and 3H32 for cooperating with a plurality of key buttons mounted on the electronic device 1000. The plurality of key buttons may be exposed to the exterior of the electronic device 1000 through the plurality of through-holes 3H31 and 3H32. The through-holes 3H31 and 3H32 may be disposed to the 3rd connection side S3. In addition, a through-hole 3H41 for supporting the key button may be disposed to the 4th connection side S4.

According to an exemplary embodiment, the bezel 30 may include a through-hole 3H42 for cooperating with a memory socket mounted on the electronic device 1000. A Subscriber Identity Module (SIM) card or a memory may be inserted to the memory socket through the through-hole 3H42. The through-hole 3H42 may be disposed to the 4th connection side S4.

According to an exemplary embodiment, the bezel 30 may include a through-hole 3HC2 for cooperating with an antenna mounted on the electronic device 1000. The antenna may be inserted to an inner space through the through-hole 3HC2, or may be extracted to the outside through the through-hole 3HC2. The through-hole 3HC2 may be disposed to the 2nd corner connection side SC2.

According to an exemplary embodiment, at least one part of the bezel 30 may be formed by using at least one part of the aforementioned housing manufacturing method of FIG. 1. For example, the bezel 30 may include a metal pattern used as an antenna radiator.

Figure 12:
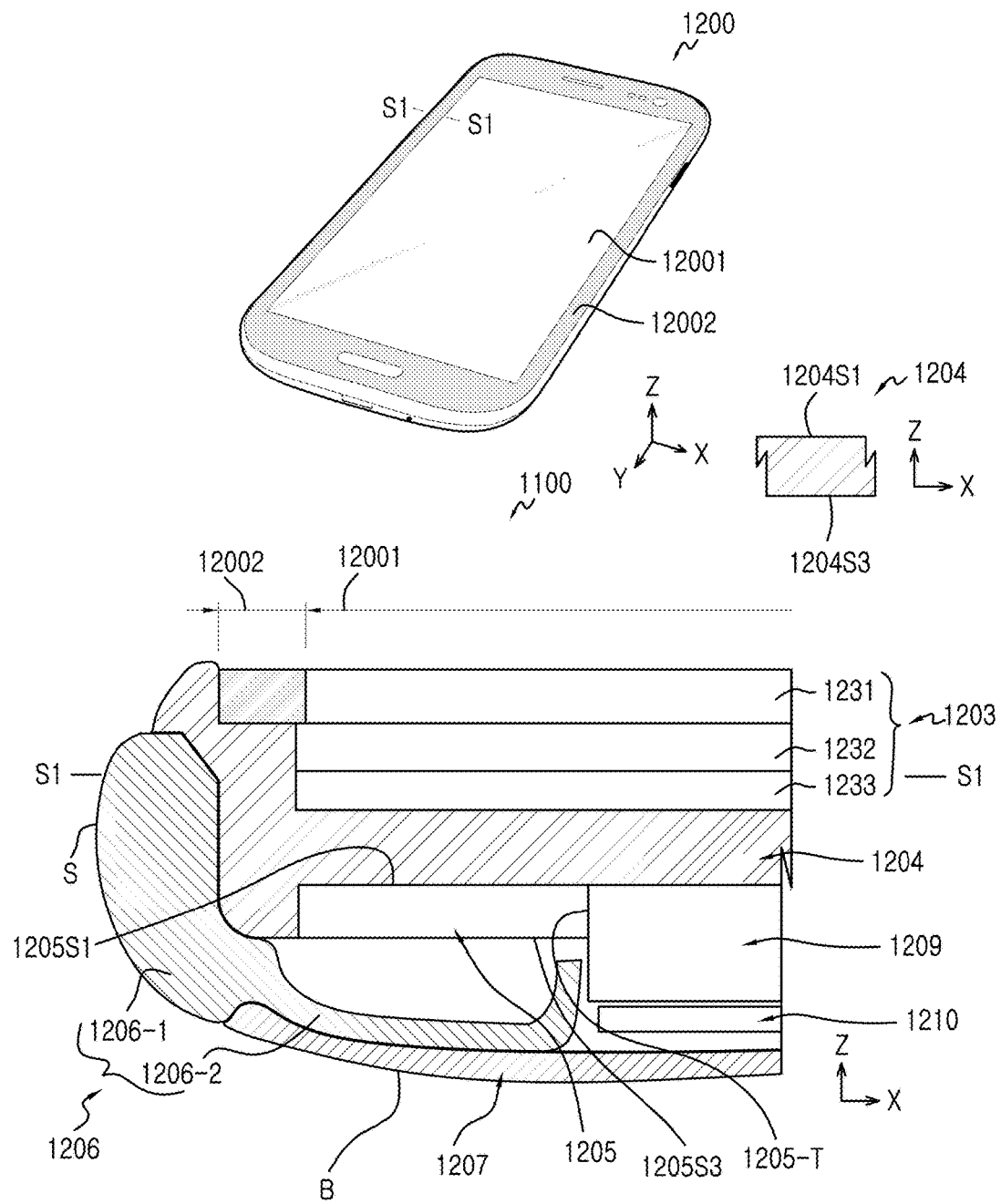
FIG. 12 illustrates a cross-sectional view of an electronic device according to an exemplary embodiment of the present disclosure.

FIG. 12 illustrates a cross-sectional view of an electronic device according to an exemplary embodiment of the present disclosure. Herein, a configuration for one part of an electronic device 1200 is provided, and such a configuration may or may not be applied to the entirety of the electronic device 1200. According to one or more exemplary embodiments, the electronic device 1200 of FIG. 12 may be the electronic device 1000 of FIG. 10.

Referring to FIG. 12, the electronic device 1200 may include a display unit 1203, a bracket 1204, a circuit board 1205, a case frame 1206, a cover 1207, a battery pack 1209, and a conductive member 1210.

According to an exemplary embodiment, the display unit 1203 may include a window 1231, a display 1232, and a display circuit board 1233. The window 1231 having a rectangular shape is coupled to the display 1232, and may form one side of the electronic device 1200. The window 1231 may include plastic or glass having shock resistance. The window 1231 may form a transparent area corresponding to a display side 12001 (e.g., the center area 1A1 of FIG. 10) and an opaque area corresponding to a non-display side 12002 (e.g., the edge area 1A2 of FIG. 10).

According to an exemplary embodiment, the display 1232 may be disposed between the window 1231 and the display circuit 1233. An image of the display 1232 may be exposed to the exterior of the electronic device through the display side 12001 of the window 1231.

According to an exemplary embodiment, the display circuit board 1233 may be disposed between the display 1232 and the circuit board 1205. The display circuit board 1233 may control an image output through the display 1232 in response to a signal provided from the circuit board 1205.

According to an exemplary embodiment, the display unit 1203 may further include a touch panel (not shown) for supporting a touch input or a hovering input. The touch panel may support the touch input or the hovering input through the display side 12001 of the display unit 1203. For example, if a finger or an electronic pen is in contact with the window 1231, the display unit 1203 may generate the touch input. For example, if the finger or the electronic pen is separated from the window 1231 but is located within a threshold distance from the window 1231, the display unit 1203 may generate the hovering input.

According to an exemplary embodiment, the bracket 1204 may be a portion in which the display unit 1203 and the circuit board 1205 are installed. For example, the bracket 1204 may have a rectangular shape which conforms to a rectangular shape of the electronic device 1200. The bracket 1204 may support one side 1204S1 and the other side 1204S3 facing each other as the portion where electronic components are installed. As illustrated, the bracket 1204 is disposed adjacent to the display unit 1203 and the circuit board 1205. The one side 1204S1 of the bracket 1204 may be the portion where the display unit 1203 is installed, and the other side 1204S3 of the bracket 1204 may be the portion where the circuit board 1205 is installed. The one side 1204S1 and the other side 1204S3 of the bracket 1204 may have grooves capable of mounting the display unit 1203 and the circuit board 1205.

According to an exemplary embodiment, the bracket 1204 may provide rigidity to the display device 1203 and the circuit board 1205. The bracket 1204 may also be used as a heat sink which shields an electromagnetic wave, blocks an electrical noise, or avoids heating of an electronic component. The bracket 1204 may be made of a metallic material such as magnesium (Mg), aluminum (Al), or the like, or without being limited thereto, may be formed of a non-metallic material such as plastic or the like. A material for shielding the electromagnetic wave may be coated on the bracket 1204.

According to an exemplary embodiment, at least one part of the bracket 1204 may be formed by using at least one part of the aforementioned housing manufacturing method of FIG. 1. For example, the bracket 1204 may include a conductive coil (not shown). The conductive coil may support various types of communication. Alternatively, the conductive coil may support wireless charging.

According to an exemplary embodiment, the circuit board 1205 (or a main board, a mother board, or a Printed Board Assembly (PBA)) may configure an execution environment for the electronic device 1200, maintain information thereof, and support data input/output exchange of devices included in the electronic device 1200. The circuit board 1205 may be coupled to the bracket 1204.

According to an exemplary embodiment, one side 1205S1 of the circuit board 1205 may be in contact with at least one part of the other side 1204S3 of the bracket 1204, and the other side 1204S3 of the bracket 1204 may provide a space (not shown) capable of containing electronic components (not shown) installed on the one side 1205S1 of the circuit board 1205. A space is prepared between the case frame 1206 and the other side 1205S3 of the circuit board 1205, and electronic components installed to the other side 1205S3 of the circuit board 1205 may be contained in the space.

According to an exemplary embodiment, the case frame 1206 (e.g., the bezel 30 of FIG. 10) may be coupled to the bracket 1204 to form an overall frame of the electronic device 1200. The electronic components (e.g., the display unit 1203 or the circuit board 1205 or the like) may be disposed inside the electronic device 1200 by being placed inside a frame structure consisting of the case frame 1206 and the bracket 1204. The case frame 1206 may include a 1st portion 1206-1 for forming one side S of the electronic device 1200 and a 2nd portion 1206-2 extended from the 1st portion 1206-1 and disposed between the bracket 1204 and the cover 1207. The 1st portion 1206-1 has a shape capable of being joined with the bracket 1204. Thus, as illustrated, a boundary portion of the bracket 1204 may be inserted into an inner surface of the 1st portion 1206-1, and the bracket 1204 may be joined with the case frame 1206 without a gap.

According to an exemplary embodiment, the 2nd portion 1206-2 may have a through-hole (not shown), and some parts (e.g., a memory socket or the like) of the electronic components of the circuit board 1205 may be inserted into the through-hole of the 2nd portion 1206-2. If the cover 1207 disclosed below covers the 2nd part 1206-2 of the case frame 1206, an electronic component of the circuit board 1205 disposed to the through-hole of the 2nd portion 1206-2 may not be visible. On the other hand, if the cover 1207 is separated from the case frame 1206, the electronic component of the circuit board 1205 disposed to the through-hole of the 2nd portion 1206-2 may be exposed.

According to an exemplary embodiment, the case frame 1206 may include a conductive material, and may be configured to be electrically connected to a ground portion of the circuit board 1205. For example, the conductive material may be coated on an inner side 1206-2S1 of the 2nd portion 1206-2 of the case frame 1206. An electrical connection between the conductive material of the case frame 1206 and the ground portion of the circuit board 1205 may be configured in such a manner that a rib (not shown) formed on the 2nd portion 1206-2 is in contact with the ground portion of the circuit board 1205. The rib of the 2nd portion 1206-2 may include a conductive rubber gasket so as to be elastically in contact with the ground portion.

According to an exemplary embodiment, the cover 1207 can be coupled to the 2nd portion 1206-2 of the case frame 1206, and may form one side B of the electronic device 1200. The cover 1207 may have a curved shape. The 2nd portion 1206-2 of the case frame 1206 may have a shape of a groove capable of mounting the cover 1207. For example, the cover 1207 may be placed to be inserted into the 2nd portion 1206-2 of the case frame 1206.

According to an exemplary embodiment, the cover 1207 may be coupled to the 2nd portion 1206-2 of the case frame 1206 using snaps. The cover 1207 can be separated from the 2nd portion 1206-2 of the case frame 1206. In order to detach an electronic component (e.g., the memory card or the battery pack 1209 or the like), the cover 1207 can be separated from the case frame 1206.

According to an exemplary embodiment, at least one part of the case frame 1206 may be formed by using at least one part of the aforementioned housing manufacturing method of FIG. 1. For example, the bracket 1204 may include a conductive coil (not shown). The conductive coil may support various types of communication. Alternatively, the conductive coil may support wireless charging.

According to an exemplary embodiment, the battery pack 1209 may be disposed to a through-hole 1205-T of the circuit board 1205. The battery 1209 may be disposed between the bracket 1204 and the cover 1207.

According to an exemplary embodiment, at least one part of the cover 1207 may be formed by using at least one part of the aforementioned housing manufacturing method of FIG. 1. For example, the cover 1207 may include a conductive coil (not shown). The conductive coil may support various types of communication. Alternatively, the conductive coil may support wireless charging.

According to an exemplary embodiment, the conductive member 1210 may be disposed between the battery pack 1209 and the cover 1207. For example, the conductive member 1210 may be disposed between a conductive coil (not shown) and the battery pack 1209.

According to an exemplary embodiment, the conductive member 1210 may be a shielding member that prevents radiation performance of the conductive coil of the cover 1207 from deteriorating due to interference from surroundings (e.g., the battery pack, etc.).

According to an exemplary embodiment, the conductive member 1210 may include ferrite.

According to an exemplary embodiment, the conductive member 1210 may be an Electro Magnetic Compatibility (EMC) shield member or film.

Figure 13:
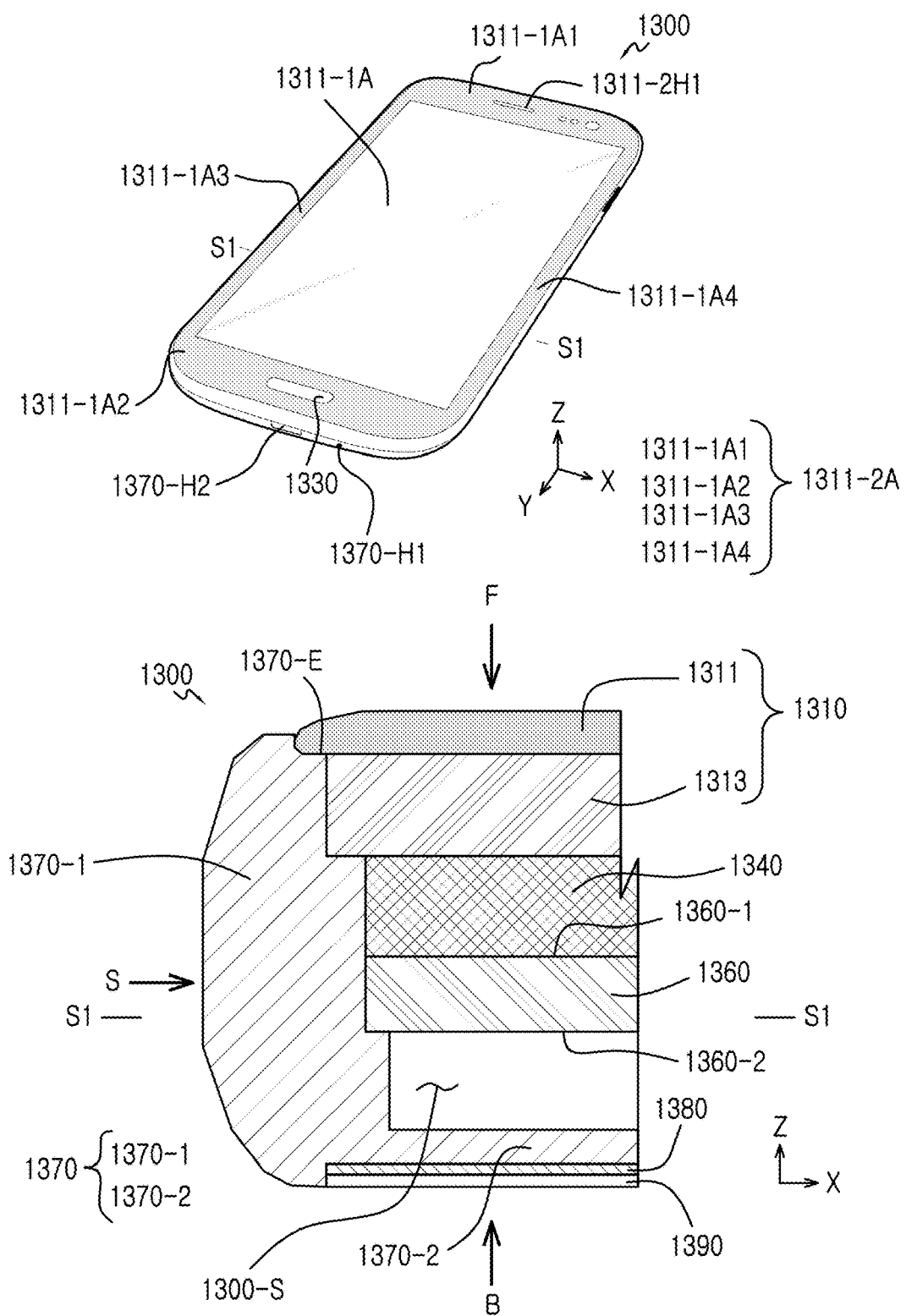
FIG. 13 illustrates a cross-sectional view of an electronic device according to an exemplary embodiment of the present disclosure.

FIG. 13 illustrates a cross-sectional view of an electronic device 1300 according to an exemplary embodiment of the present disclosure. According to one or more exemplary embodiments, the electronic device 1300 may be the electronic device 1000 of FIG. 10. Herein, a configuration for one part of the electronic device 1300 is provided, and such a configuration may not be applied to the entirety of the electronic device 1300.

Referring to FIG. 13, the electronic device 1300 may include a display unit 1310, a bracket 1340, a circuit board 1360, a case frame 1370, a non-conductive member 1380, or a coating layer 1390.

According to an exemplary embodiment, the display unit 1310 may include a window 1311 and/or a display 1313.

According to an exemplary embodiment, the window 1311 may have a roughly rectangular shape, and may be made of plastic or glass having shock resistance. The window 1311 may be coupled to the case frame 1370, and may form a 1st side F (e.g., a front side) of the electronic device 1300. For example, a ring-shaped edge of the window 1311 may be coupled to a ring-shaped window install portion 1370-E of the case frame 1370 by using a coupling means (e.g., a double-sided tape). If the window 1311 and the case frame 1370 are coupled, a space capable of containing the display 1313 and the circuit board 1360 may be provided. The display 1313 may be coupled to the window 1311.

According to an exemplary embodiment, the window 1311 may include a transparent 1st area 1311-1A and an opaque 2nd area 1311-2A. The 1st area 1311-1A overlaps with an image display area of the display 1313, and an image of the display 1313 may be exposed to the exterior of the electronic device through the 1st area 1311-1A. For example, the 1st area 1311-1A has a rectangular shape, and may be the central area 1A1 of the electronic device 1000 of FIG. 10.

According to an exemplary embodiment, the 2nd area 1311-2A is a ring-shaped area which surrounds the 1st area 1311-1A, and may include a 1st edge area 1311-1A1, a 2nd edge area 1311-1A2, a 3rd edge area 1311-1A3, and a 4th edge area 1311-1A4.

According to one or more exemplary embodiments, the 1st edge area 1311-1A1 and the 2nd edge area 1311-1A2 may be disposed at opposite sides in a long-length direction of the rectangular window 1311. The 3rd edge area 1311-1A3 and the 4th edge area 1311-1A4 may be disposed at opposite sides in a short-length direction of the rectangular window 1311.

According to one or more exemplary embodiments, the 1st edge area 1311-1A1 and the 2nd edge area 1311-1A2 may have a relatively wider width than the 3rd edge area 1311-1A3 and the 4th edge area 1311-1A4.

According to an exemplary embodiment, the 2nd area 1311-2A may include a plurality of through-holes. For example, the window 1311 may include a sound input/output assisting hole 1311-2H1 disposed to the 2nd area 1311-2A (e.g., e.g., the 1st edge area 1311-1A1). Sound from a speaker or receiver equipped in the electronic device 1300 may be outputted through the sound input/output assisting hole 1311-2H1. For example, the window 1311 may include a button assisting hole (not shown) disposed to the 2nd area 1311-2A (e.g., the 2nd edge area 1311-1A2). The button 1330 equipped in the electronic device 1300 may be exposed to the exterior of the electronic device by being inserted into the button assisting hole.

According to an exemplary embodiment, the window 1311 may include at least one of sensor supporting areas (not shown) disposed to the 2nd area 1311-2A (e.g., the 1st edge area 1311-1A1). For example, the sensor supporting areas may be configured to support a sensor (an illumination sensor, an image sensor, or a proximity sensor) equipped in the electronic device 1300 by allowing the corresponding stimuli to be detected by the sensor. For example, the sensor supporting area for supporting an illumination sensor may allow light to be transmitted to the illumination sensor.

According to an exemplary embodiment, the display 1313 may be disposed between the window 1311 and the circuit board 1360. The display 1313 is configured to display an electrical signal provided from the circuit board 1360 in a form of an image, and may include a Liquid-Crystal Display (LCD), an Organic Light-Emitting Diode (OLED) (e.g., Active-Matrix (AM)-OLED), or the like.

According to an exemplary embodiment, the display device 1310 may further include a touch panel for a touch input or a hovering input. For example, the display device 1310 may support the touch input or the hovering input through the 1st area 1311-1A of the window 1311.

According to various exemplary embodiments, the display device 1310 may provide a display integrated touch screen. For example, the display device 1310 may be an AM-OLED integrated touch screen (i.e., an On-Cell TSP AMOLED (OCTA)).

According to an exemplary embodiment, the circuit board 1360 (or a main board, a mother board, a Printed Circuit Board (PCB), or a Printed Board Assembly (PBA)) may be configured to have a plurality of electronic components and to include an electrical circuit for connecting the components. The circuit board 1360 may configure an execution environment of the electronic device 1300, maintain information thereof, and support data input/output exchange of devices included in the electronic device 1300.

According to an exemplary embodiment, the circuit board 1360 may include a 1st side 1360-1 and 2nd side 1360-2 configured to be capable of mounting the electronic components. The 1st side 1360-1 may face the 1st side F of the electronic device 1300, and the 2nd side 1360-2 may face a 2nd side B (e.g., a back side) of the electronic device 1300.

According to an exemplary embodiment, the bracket 1340 may be disposed between the display device 1310 and the circuit board 1360. The bracket 1340 may be coupled to the case frame 1370. As illustrated, the bracket 1340 may be disposed adjacent to the display 1310 and the circuit board 1360. One side of the bracket 1340 may be capable of receiving the display 1310, and the other side of the bracket 1340 may be capable of receiving the circuit board 1360.

According to an exemplary embodiment, the bracket may be made of metal such as magnesium (Mg), aluminum (Al), stainless (STS), or the like. Alternatively, the bracket may be made of a non-metallic material. For example, the bracket may be made of a high-strength plastic material. Alternatively, the bracket may also include both of metallic and non-metallic (plastic) materials. Alternatively, a material for shielding an electromagnetic wave may be coated on the bracket.

According to an exemplary embodiment, the case frame 1370 may have a roughly container shape which is open, and may form an overall frame of the electronic device 1300. Electronic components (e.g., the display device 1310, the bracket 1340, the circuit board 1360, etc.) may be installed within the case frame 1370.

According to an exemplary embodiment, at least one part of the case frame 1370 may be made of a metallic material.

According to one or more exemplary embodiments, the case frame 1370 may include a 1st portion 1370-1 for forming a 3rd side S (e.g., a lateral side) of the electronic device 1300 and a 2nd portion 1370-2 extended from the 1st portion 1370-1 and disposed between the circuit board 1360 and the non-conductive member 1380.

According to one or more exemplary embodiments, the case frame 1370 may have a shape capable of being coupled to the circuit board 1360, and the circuit board 1360 may be placed on the case frame 1370. For example, the case frame 1370 may have a plurality of ribs (not shown) extended to the 2nd side 1360-2 of the circuit board 1360, and these ribs may be configured to support the circuit board 1360.

According to one or more exemplary embodiments, the 2nd portion 1370-2 of the case frame 1370 may include a battery pack containing portion 1300-S for providing a space for containing a battery pack (not shown).

According to one or more exemplary embodiments, the case frame 1370 may include a conductive material, and may be configured to be electrically connected to a ground portion of the circuit board 1360. For example, the conductive material may be coated on one side of the 2nd portion 1370-2 of the case frame 1370.

According to an exemplary embodiment, the non-conductive member 1380 may be coupled to the 2nd portion 1370-2 of the case frame 1370. For example, the case frame 1370 may be made of a metallic material, and the non-conductive member 1380 may be formed with the case frame 1370 through insert injection.

According to an exemplary embodiment, at least one part of the case frame 1370 may include a radiator (e.g., a conductive coil). For example, the 2nd portion 1370-2 and the non-conductive member 1380 of the case frame 1370 may be formed using the housing manufacturing method of FIG. 1, and the conductive coil may be provided within the case frame 1370. The conductive coil may support various types of communication. Alternatively, the conductive coil may support wireless charging.

According to an exemplary embodiment, the coating layer 1390 is a portion of covering the non-conductive member 1380, and may form at least one part of the back side B of the electronic device 1300.

Figure 14:
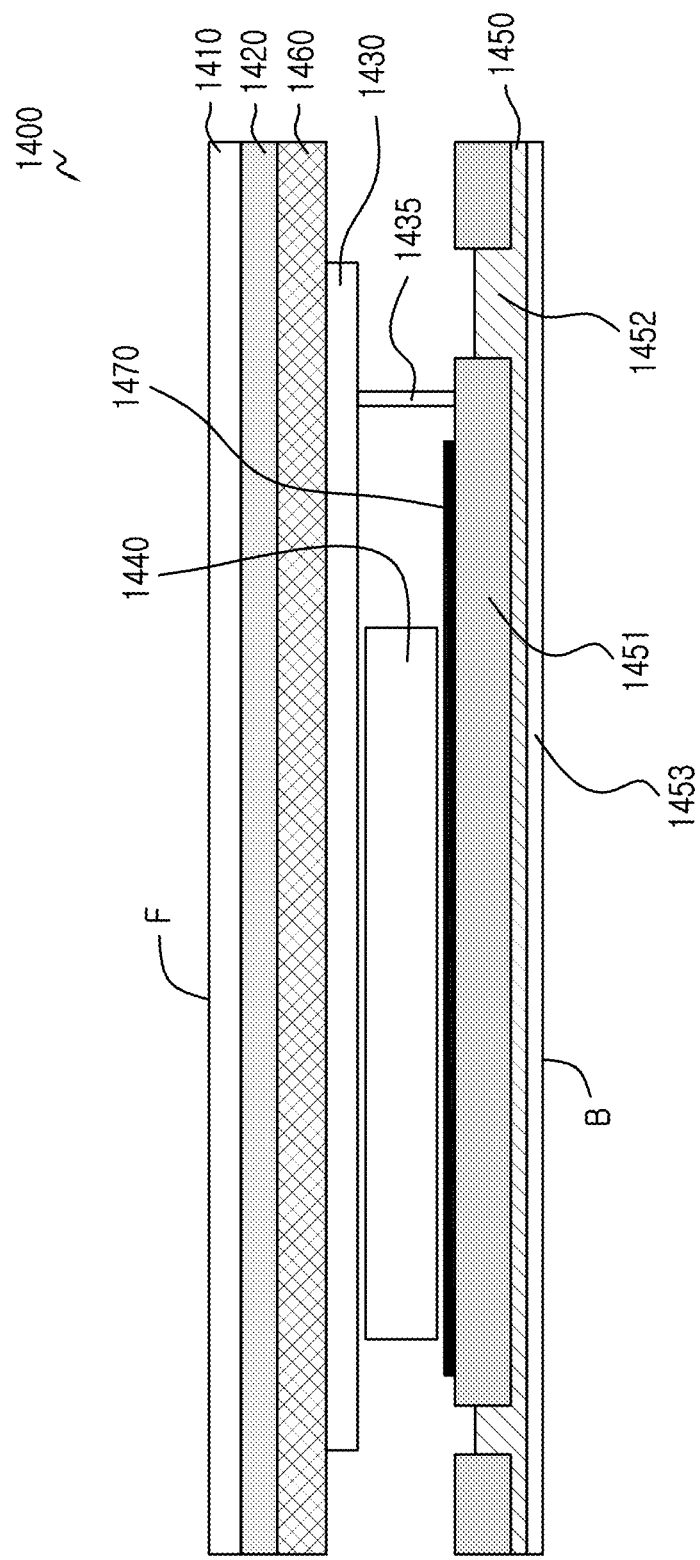
FIG. 14 illustrates a cross-sectional view of an electronic device according to an exemplary embodiment of the present disclosure.

FIG. 14 illustrates a cross-sectional view of an electronic device 1400 according to an exemplary embodiment of the present disclosure. According to one or more exemplary embodiments, the electronic device 1400 may be the electronic device 1000 of FIG. 10. Herein, a configuration for one part of the electronic device 1400 is provided, and such a configuration may or may not be applied to the entirety of the electronic device 1400.

Referring to FIG. 14, the electronic device 1400 may include a window 1410, a display 1420, a circuit board 1430, a battery pack 1440, a housing 1450, a bracket 1460, and an electrical shielding member 1470.

According to an exemplary embodiment, the window 1410 may form a 1st side F of the electronic device 1400. The window 1410 may be coupled to the display 1420.

According to an exemplary embodiment, the display 1420 may be displayed between the window 1410 and the circuit board 1430. An image of the display 1420 may be exposed to the exterior of the electronic device through the window 1410. The display 1420 may be electrically connected to the circuit board 1430, and may display an image depending on a control signal of the circuit board 1430.

According to an exemplary embodiment, the battery pack 1440 may be disposed between the circuit board 1430 and the housing 1450.

According to an exemplary embodiment, the housing 1450 may form a 2nd side B of the electronic device 1400.

According to an exemplary embodiment, at least one part of the housing 1450 may be formed on the basis of at least one part of the housing manufacturing method of FIG. 1. For example, the housing 1450 may include a non-conductive member 1452, a metal pattern 1451, and a coating layer 1453.

According to an exemplary embodiment, insert injection may be used to form a shape in which the non-conductive member 1452 is coupled to the metal pattern 1451.

According to an exemplary embodiment, the metal pattern 1451 may be electrically connected to the circuit board 1430.

According to an exemplary embodiment, the circuit board 1430 may include a feeding contact and a ground contact (not shown). For example, the metal pattern 1451 may have a line pattern. The metal pattern 1451 may include a 1st end and a 2nd end (not shown). The 1st end of the metal pattern 1451 may be electrically connected to the feeding contact of the circuit board 1430 by means of an electric connector 1435. The 2nd end of the metal pattern 1451 may be electrically connected to the ground contact of the circuit board 1430 by means of the electric connector 1435.

According to an exemplary embodiment, the bracket 1460 may be disposed between the display 1420 and the circuit board 1430. The bracket 1460 may be disposed adjacent to the display 1420 and the circuit board 1430. One side of the bracket 1460 may be capable of receiving the display 1420, and the other side (of the bracket 1460 may be capable of receiving the circuit board 1430.

According to an exemplary embodiment, the electric connector 1435 may include a C-clip, a pogo-pin, a spring, a conductive poron and rubber, a conductive tape, a cooper connector, or the like.

According to an exemplary embodiment, the metal pattern 1451 may support various types of communication. The metal pattern 1451 may support near-distance communication. For example, the near-distance communication may include at least one of Wireless Fidelity (WiFi), Bluetooth, Near Field Communication (NFC), Global Navigation Satellite System (GNSS), or the like. According to a usage region, a bandwidth, or the like, the GNSS may include at least one of, for example, GPS, Glonass, Beidou navigation satellite system, and Galileo, the European global satellite-based navigation system.

According to various exemplary embodiment, the metal pattern 1451 may support magnetic signal (MST) transmission/reception.

According to various exemplary embodiments, the metal pattern 1451 may support cellular communication.

According to various exemplary embodiments, the metal pattern 1451 may support wireless charging.

According to an exemplary embodiment, the metal pattern 1451 may be a conductive coil including a plurality of turns.

According to an exemplary embodiment, the coating layer 1453 may be formed by a post-processing operation. For example, the coating layer 1453 may prevent fingerprint smudges.

According to an exemplary embodiment, the electrical shielding member 1470 may be disposed between the battery pack 1440 and the metal pattern 1451 of the housing 1450. The electrical shielding member 1470 may prevent the radiation performance of the metal pattern 1451 of the housing 1450 from deteriorating due to the interference from the battery pack, for example.

According to an exemplary embodiment, the electrical shielding member 1470 may include a ferrite sheet.

Figure 15:
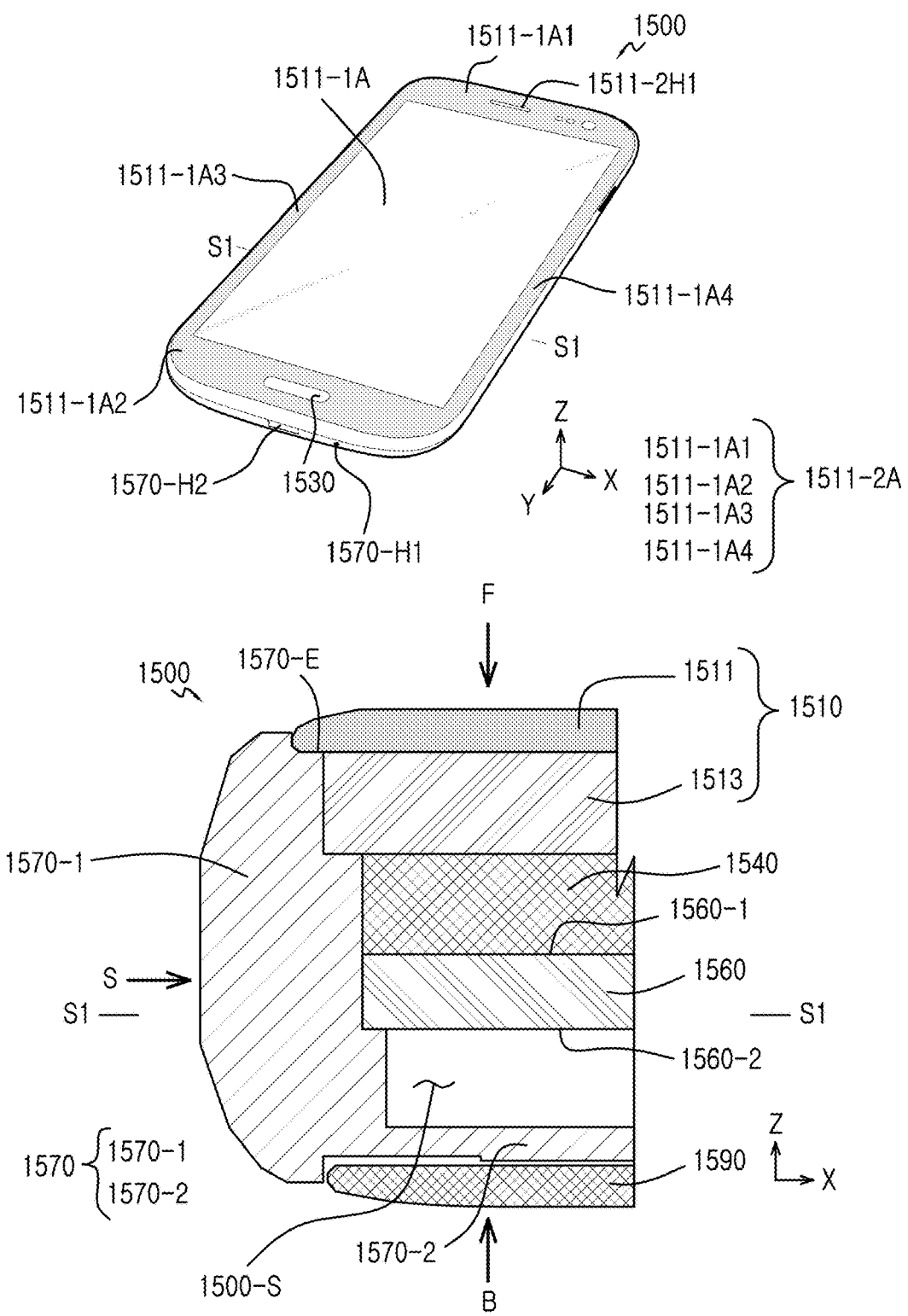
FIG. 15 illustrates a cross-sectional view of an electronic device according to an exemplary embodiment of the present disclosure.

FIG. 15 illustrates a cross-sectional view of an electronic device 1500 according to an exemplary embodiment of the present disclosure. According to one or more exemplary embodiments, the electronic device 1500 may be the electronic device 1000 of FIG. 10. Herein, a structure for one part of the electronic device 1500 is provided, and such a structure may or may not be applied to the entirety of the electronic device 1500.

Referring to FIG. 15, the electronic device 1500 may include a display unit 1510, a bracket 1540, a circuit board 1560, a case frame 1570, or a cover 1590.

According to an exemplary embodiment, the display unit 1510 may include a window 1511 and a display 1513.

According to an exemplary embodiment, the window 1511 may have a roughly rectangular shape, and may be made of plastic or glass having shock resistance. The window 1511 may be coupled to the case frame 1570, and may form a 1st side F (e.g., a front side) of the electronic device 1500. For example, a ring-shaped edge of the window 1511 may be coupled to a ring-shaped window install portion 1570-E of the case frame 1570 by using a coupling means (e.g., a double-sided tape). If the window 1511 and the case frame 1570 are coupled, a space capable of containing the display 1513 and the circuit board 1560 may be provided. The display 1513 may be coupled to the window 1511.

According to an exemplary embodiment, the window 1511 may include a transparent 1st area 1511-1A and an opaque 2nd area 1511-2A. The 1st area 1511-1A overlaps with an image display area of the display 1513, and an image of the display 1513 may be visible to the exterior of the electronic device through the 1st area 1511-1A. The 1st area 1511-1A has a rectangular shape, and may be the central area 1A1 of the electronic device 1000 of FIG. 10.

According to an exemplary embodiment, the 2nd area 1511-2A is a ring-shaped area which surrounds the 1st area 1511-1A, and may include a 1st edge area 1511-1A1, a 2nd edge area 1511-1A2, a 3rd edge area 1511-1A3, and a 4th edge area 1511-1A4.

According to one or more exemplary embodiments, the 1st edge area 1511-1A1 and the 2nd edge area 1511-1A2 may be disposed at opposite sides in a length-wise direction of the rectangular window 1511. The 3rd edge area 1511-1A3 and the 4th edge area 1511-1A4 may be disposed at opposite sides in a width-wise direction of the rectangular window 1511.

According to one or more exemplary embodiments, the 1st edge area 1511-1A1 and the 2nd edge area 1511-1A2 may have a relatively wider width than the 3rd edge area 1511-1A3 and the 4th edge area 1511-1A4.

According to an exemplary embodiment, the 2nd area 1511-2A may include a plurality of through-holes. For example, the window 1511 may include a sound input/output assisting hole 1511-2H1 disposed to the 2nd area 1511-2A (e.g., e.g., the 1st edge area 1511-1A1). Sound from a speaker or receiver equipped in the electronic device 1500 may be outputted through the sound input/output assisting hole 1511-2H1. For example, the window 1511 may include a button assisting hole (not shown) disposed to the 2nd area 1511-2A (e.g., the 2nd edge area 1511-1A2). The button 1530 equipped in the electronic device 1500 may be exposed to the exterior of the electronic device 1500 by being inserted into the button assisting hole.

According to an exemplary embodiment, the window 1511 may include at least one of sensor supporting areas (not shown) disposed to the 2nd area 1511-2A (e.g., the 1st edge area 1511-1A1). For example, the sensor supporting areas may be configured to support a sensor (an illumination sensor, an image sensor, or a proximity sensor) equipped in the electronic device 1500 by allowing the corresponding stimuli to be detected by the sensor. For example, the sensor supporting area for supporting an illumination sensor may allow light to be transmitted to the illumination sensor.

According to an exemplary embodiment, the display 1513 may be disposed between the window 1511 and the circuit board 1560. The display 1513 is configured to display an electrical signal provided from the circuit board 1560 in a form of an image, and may include a Liquid-Crystal Display (LCD), an Organic Light-Emitting Diode (OLED) (in particular, Active-Matrix (AM)-OLED), or the like.

According to an exemplary embodiment, the display device 1510 may further include a touch panel for a touch input or a hovering input. For example, the display device 1510 may support the touch input or the hovering input through the 1st area 1511-1A of the window 1511.

According to various exemplary embodiments, the display device 1510 may provide a display integrated touch screen. For example, the display device 1510 may be an AM-OLED integrated touch screen (i.e., an On-Cell TSP AMOLED (OCTA)).

According to an exemplary embodiment, the bracket 1540 may be disposed between the display device 1510 and the circuit board 1560. The bracket 1540 may be disposed adjacent to the display 1510 and the circuit board 1560. One side of the bracket 1540 may be capable of receiving the display 1510, and the other side of the bracket 1540 may be capable of receiving the circuit board 1560.

According to an exemplary embodiment, the circuit board 1560 (or a main board, a mother board, a Printed Circuit Board (PCB), or a Printed Board Assembly (PBA)) may be configured to have a plurality of electronic components and to include an electrical circuit for connecting the components. The circuit board 1560 may configure an execution environment of the electronic device 1500, maintain information thereof, and support data input/output exchange of devices included in the electronic device 1500.

According to an exemplary embodiment, the circuit board 1560 may include a 1st side 1560-1 and 2nd side 1560-2 configured to be capable of mounting the electronic components. The 1st side 1560-1 may face the 1st side F of the electronic device 1500, and the 2nd side 1560-2 may face a 2nd side B (e.g., a back side) of the electronic device 1500.

According to an exemplary embodiment, the case frame 1570 may have a roughly container shape which is open, and may form an overall frame of the electronic device 1500. Electronic components (e.g., the display device 1510, the circuit board 1560, etc.) may be installed within the case frame 1570.

According to one or more exemplary embodiments, the case frame 1570 may include a 1st portion 1570-1 for forming a 3rd side S (e.g., a lateral side) of the electronic device 1500 and a 2nd portion 1570-2 extended from the 1st portion 1570-1 and disposed between the circuit board 1560 and the cover 1590.

According to one or more exemplary embodiments of the present disclosure, the case frame 1570 may have a shape capable of being coupled to the circuit board 1560, and the circuit board 1560 may be placed on the case frame 1570. For example, the case frame 1570 may have a plurality of ribs (not shown) extended to the 2nd side 1560-2 of the circuit board 1560, and these ribs may be configured to support the circuit board 1560.

According to one or more exemplary embodiments of the present disclosure, the 2nd portion 1570-2 of the case frame 1570 may include a battery pack containing portion 1500-S for providing a space for containing a battery pack (not shown).

According to one or more exemplary embodiments of the present disclosure, the case frame 1570 may include a conductive material, and may be configured to be electrically connected to a ground portion of the circuit board 1560. For example, the conductive material may be coated on one side of the 2nd portion 1570-2 of the case frame 1570.

According to an exemplary embodiment, the cover 1590 can be coupled to the 2nd portion 1570-2 of the case frame 1570, and may form a 2nd side B of the electronic device 1500. The 2nd portion 1570-2 of the case frame 1570 may have a shape of a groove capable of mounting the cover 1590. Therefore, the cover 1590 may be placed to be inserted into the 2nd portion 1570-2 of the case frame 1570.

According to an exemplary embodiment, at least one part of the case frame 1570 may be formed by using at least one part of the aforementioned housing manufacturing method of FIG. 1. For example, the case frame 1570 may include a conductive coil. The conductive coil may support various types of communication. Alternatively, the conductive coil may support wireless charging.

According to an exemplary embodiment, at least one part of the cover 1590 may be formed by using at least one part of the aforementioned housing manufacturing method of FIG. 1. For example, the cover 1590 may include a conductive coil. The conductive coil may support various types of communication. Alternatively, the conductive coil may support wireless charging.

According to an exemplary embodiment, at least one part of the bracket 1540 may be formed by using at least one part of the aforementioned housing manufacturing method of FIG. 1. For example, the bracket 1540 may include a conductive coil. The conductive coil may support various types of communication. Alternatively, the conductive coil may support wireless charging.

Figure 16:
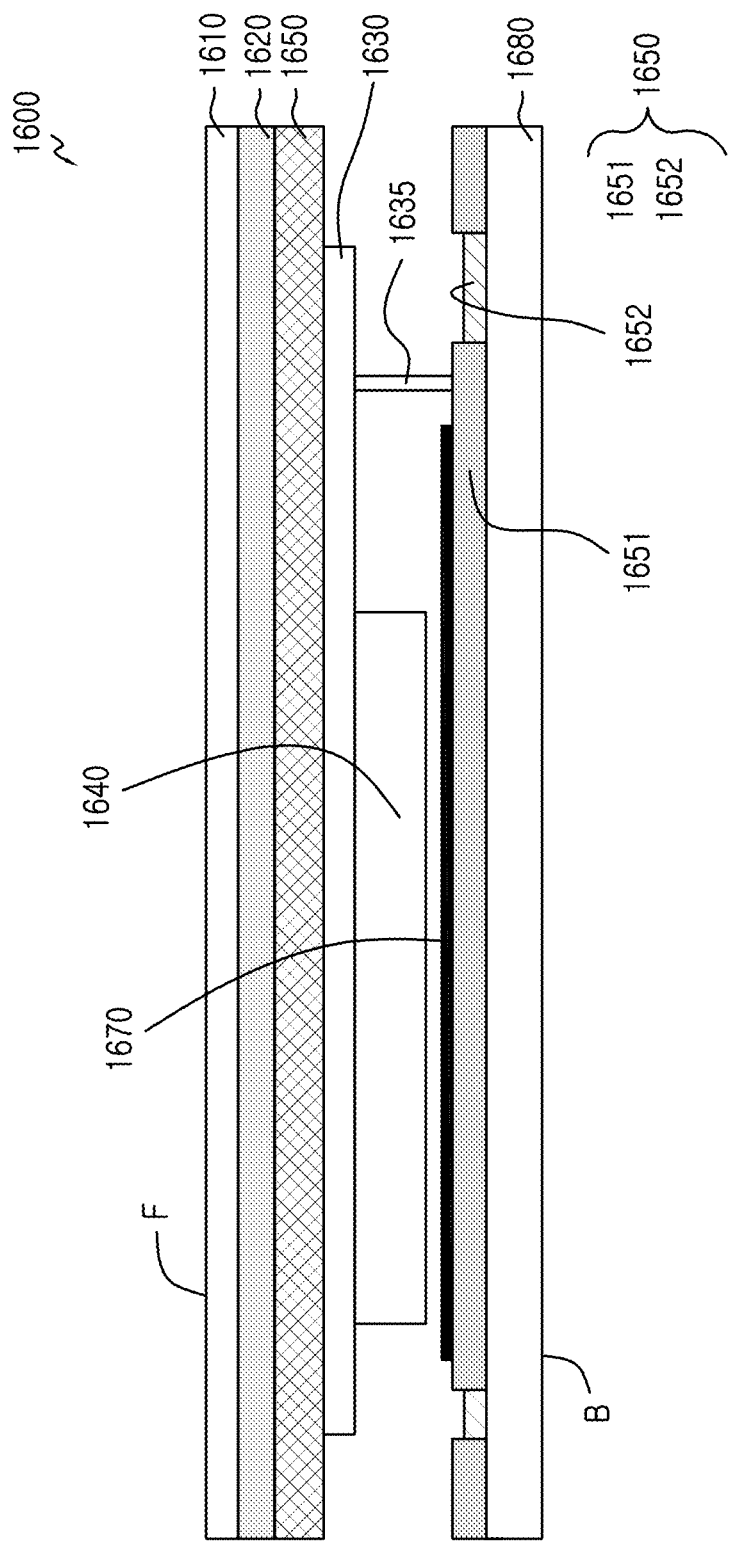
FIG. 16 illustrates a cross-sectional view of an electronic device according to an exemplary embodiment of the present disclosure.

FIG. 16 illustrates a cross-sectional view of an electronic device 1600 according to an exemplary embodiment of the present disclosure. According to one or more exemplary embodiments, the electronic device 1600 may be the electronic device 1000 of FIG. 10. Herein, a configuration for one part of the electronic device 1600 is provided, and such a configuration may or may not be applied to the entirety of the electronic device 1600.

Referring to FIG. 16, the electronic device 1600 may include a window 1610, a display 1620, a circuit board 1630, a battery pack 1640, a bracket 1650, a metal housing 1660, an electrical shielding member 1670, and a cover 1680.

According to an exemplary embodiment, the window 1610 may form a 1st side F (e.g., a front side) of the electronic device 1600. The window 1610 may include plastic or glass having shock resistance.

According to an exemplary embodiment, the display 1620 may be displayed between the window 1610 and the circuit board 1630. An image of the display 1620 may be visible to the exterior of the electronic device through the window 1610. The display 1620 may be electrically connected to the circuit board 1630, and may display an image depending on a control signal of the circuit board 1630.

According to an exemplary embodiment, the battery pack 1640 may be disposed between the circuit board 1630 and the housing 1660.

According to an exemplary embodiment, the bracket 1650 may be disposed between the display 1620 and the circuit board 1630. The bracket 1650 may be disposed adjacent to the display 1620 and the circuit board 1630. One side of the bracket 1650 may be capable of receiving the display 1620, and the other side of the bracket 1650 may be supported as a portion capable of receiving the circuit board 1630.

According to an exemplary embodiment, the housing 1660 may form a 2nd side B (e.g., a back side) of the electronic device 1600.

According to an exemplary embodiment, the housing 1660 may include the 2nd portion 1570-2 of the case frame 1570 of FIG. 15.

According to an exemplary embodiment, at least one part of the housing 1660 may be formed on the basis of at least one part of the housing manufacturing method of FIG. 1. For example, the housing 1660 may include a non-conductive member 1652 and a metal pattern 1651.

According to an exemplary embodiment, insert injection may be used to form a shape in which the non-conductive member 1652 is coupled to the metal pattern 1651.

According to an exemplary embodiment, the metal pattern 1651 may be electrically connected to the circuit board 1630.

According to an exemplary embodiment, the circuit board 1630 may include a feeding contact and a ground contact (not shown). For example, the metal pattern 1651 may have a line pattern. The metal pattern 1651 may include a 1st end and a 2nd end (not shown). The 1st end of the metal pattern 1651 may be electrically connected to the feeding contact of the circuit board 1630 by means of an electric connector 1635. The 2nd end of the metal pattern 1651 may be electrically connected to the ground contact of the circuit board 1630 by means of the electric connector 1635.

According to an exemplary embodiment, the electric connector 1635 may include a C-clip, a pogo-pin, a spring, a conductive poron and rubber, a conductive tape, a cooper connector, or the like.

According to an exemplary embodiment, the metal pattern 1651 may support various types of communication. The metal pattern 1651 may support near-distance communication. For example, the near-distance communication may include at least one of Wireless Fidelity (WiFi), Bluetooth, Near Field Communication (NFC), Global Navigation Satellite System (GNSS), or the like. According to a usage region, a bandwidth, or the like, the GNSS may include at least one of, for example, GPS, Glonass, Beidou navigation satellite system, and Galileo, the European global satellite-based navigation system.

According to one or more exemplary embodiments, the metal pattern 1651 may support magnetic signal (MST) transmission/reception.

According to one or more exemplary embodiments, the metal pattern 1651 may support cellular communication.

According to one or more exemplary embodiments, the metal pattern 1651 may support wireless charging.

According to an exemplary embodiment, the metal pattern 1651 may be a conductive coil including a plurality of turns.

According to an exemplary embodiment, the electrical shielding member 1670 may be disposed between the battery pack 1640 and the metal pattern 1651 of the housing 1660. The electrical shielding member 1670 may prevent radiation performance of the metal pattern 1651 of the housing 1660 from deteriorating due to the interference from the battery pack, for example.

According to an exemplary embodiment, the electrical shielding member 1670 may include a ferrite sheet.

According to an exemplary embodiment, the cover 1680 may be coupled to the housing 1660, and may form at least one part of the exterior of the electronic device 1600.

According to an exemplary embodiment, the cover 1680 may include a transparent layer. The transparent layer may be made of a plastic material or a glass material, for example, acrylic having shock resistance. For example, the transparent layer may be made of tempered glass.

According to one or more exemplary embodiments, the cover 1680 may have a transparent layer that may be tinted with various colors. Alternatively, the cover 1680 may further include a color layer including dye, paint, pigment, a fluorescent material, or a phosphorescent material to generate a specific color.

According to one or more exemplary embodiments, the cover 1680 may further include a plastic film. The plastic film may be made of a material having a high thermostability and a high mechanical strength. For example, the plastic film may be a polyester (PET) film, a polycarbonate (PC) film, a polyethylene (PE) film, a polypropylene (PP) film, or the like.

According to one or more exemplary embodiments, the cover 1680 may further include a pattern layer. The pattern layer may include various patterns (e.g., a plane pattern or an input pattern) attached additionally or formed in a printed manner. For example, the pattern layer may be formed through UltraViolet (UV) molding. The pattern layer may be formed to express a metal texture when it is visible by external light. The pattern layer may be disposed inside the cover 1680, and the pattern of the pattern layer may be visible stereoscopically through a transparent layer.

According to one or more exemplary embodiments, the cover 1680 may further include a metal layer. The metal layer may be formed by performing physical deposition (e.g., Physical Vapor Deposition (PVD)) or chemical deposition (Chemical Vapor Deposition (CVD)) or coating on metal (e.g., Sn, Al, Si, Ti, TiC, TiN, TiCB, Al2O3, etc.). The metal layer may be made visible by external light. In addition, the metal layer may be disposed inside the cover 1680, and the metal layer may be visible stereoscopically through a transparent layer.

According to one or more exemplary embodiments, the cover 1680 may further include a light-shielding layer for shielding the light. The light-shielding layer may include a component colored black which absorbs the light instead of reflecting the light. The light-shielding layer may be a layer printed in black. Alternatively, the light-shielding layer may be an adhesive material.

According to one or more exemplary embodiments, the window 1610 may be a transparent layer added with at least one of the aforementioned color layer, plastic layer, pattern layer, metal layer, and light-shielding layer.

Figure 17:
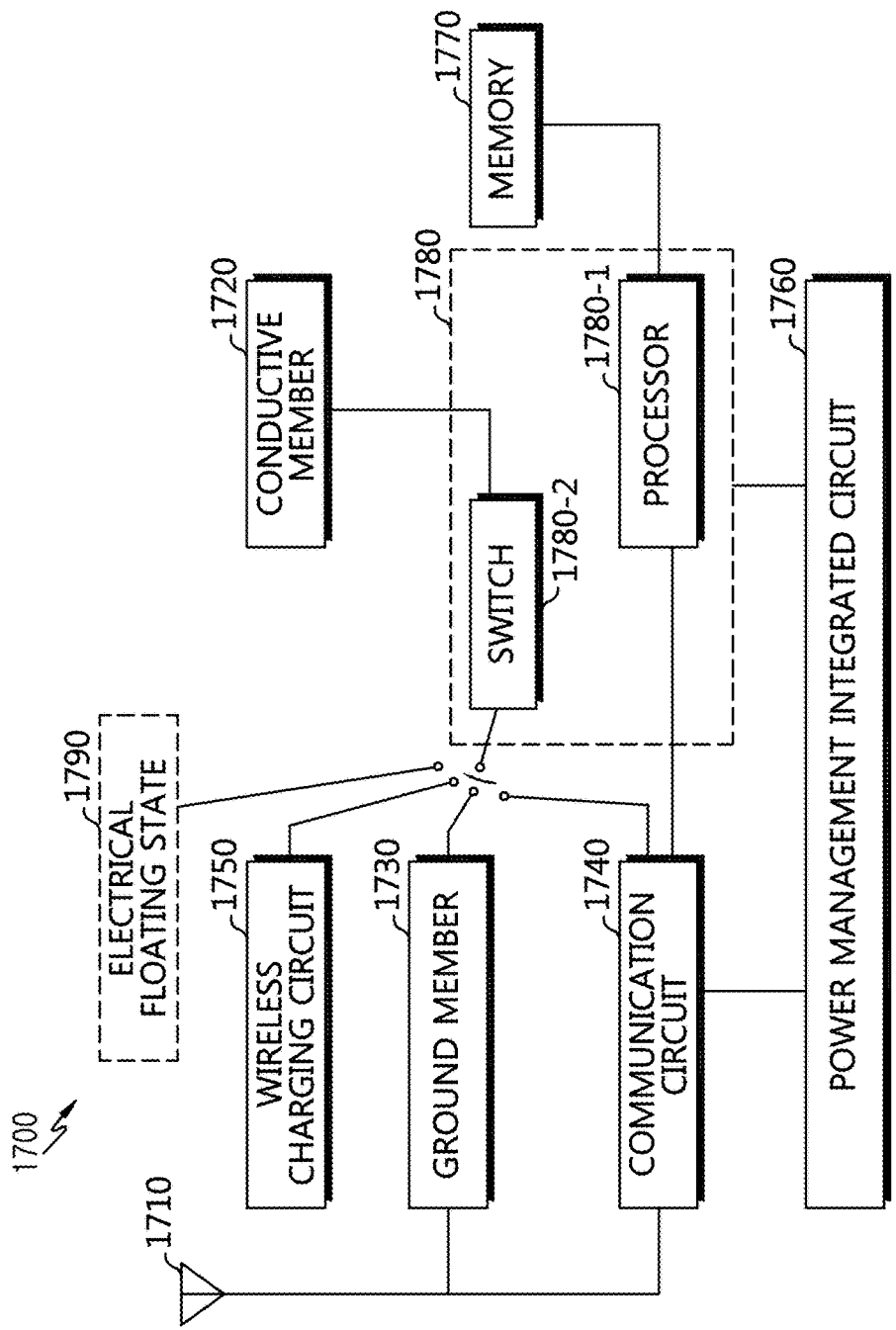
FIG. 17 illustrates a structure of an electronic device according to an exemplary embodiment of the present disclosure.

FIG. 17 illustrates a structure of an electronic device according to an exemplary embodiment of the present disclosure. According to one or more exemplary embodiments, an electronic device 1700 may be the electronic device 1000 of FIG. 10.

Referring to FIG. 17, the electronic device 1700 may include an antenna radiator 1710, a conductive member 1720, a ground member 1730, a communication circuit 1740, a wireless charging circuit 1750, a Power Management Integrated Circuit (PMIC) 1760, a memory 1770, and a control circuit 1780.

According to an exemplary embodiment, the antenna radiator 1710 may support various types of communication. For example, the antenna radiator 1710 may be used in cellular communication. The cellular communication may include at least one of, for example, Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like.

According to an exemplary embodiment, the antenna radiator 1710 may be disposed in various locations of the electronic device 1700. For example, the antenna radiator 1710 may be disposed at least partially inside and/or to one part of a housing forming an exterior of the user device 1700.

According to an exemplary embodiment, the housing may be embedded with the antenna radiator 1710 while the housing also forms the exterior of the electronic device 1700. When the housing is made of metal, the antenna radiator1710 may be constructed using at least a part of the metal area of the housing. In another embodiment, the antenna radiator 1710 may be constructed using at least a part of the metal area of the housing and is exposed to the exterior of the electronic device.

According to one or more exemplary embodiments of the present disclosure, the antenna radiator 1710 may be connected to the PCB on which the communication circuit 1740, the wireless charging circuit 1750, and the control circuit 1780 are mounted.

According to an exemplary embodiment, the antenna radiator 1710 may be electrically connected to the communication circuit 1740. The antenna radiator 1710 may be electrically connected to a ground of a PCB (not shown) (hereinafter, a ground). For example, the antenna radiator 1710 may include a conductive pattern including a 1st end and a 2nd end. The 1st end may be electrically connected to the communication circuit 1740. The 2nd end may be electrically connected to the PCB ground. The communication circuit 1740 may provide current to the antenna radiator 1710. The current may circulate along a conductive pattern of the antenna radiator 1710 and flow into the PCB ground, and a transmission line capable of transmitting/receiving a wireless electromagnetic wave may be formed.

According to one or more exemplary embodiments, the antenna radiator 1710 may be configured of at least one type of a monopole antenna, a dipole antenna, an inverted-F antenna (IFA), a planer inverted-F antenna (PIFA), a loop antenna, or a slot antenna.

According to an exemplary embodiment, the ground member 1730 may be disposed between a 1st side and 2nd side of a housing that form the exterior of the electronic device 1700.

According to an exemplary embodiment, the ground member 1730 may be at least partially disposed inside the housing or disposed in one part of the housing.

According to an exemplary embodiment, the ground member 1730 may be one part of a Printed Circuit Board (PCB) of the electronic device 1700. For example, the ground member 1730 may include a PCB ground.

According to an exemplary embodiment, the ground member 1730 may be electrically connected to the antenna radiator 1710. The ground member 1730 may be the antenna ground for the resonance of the antenna radiator 1710.

According to an exemplary embodiment, the communication circuit 1740 may be electrically connected to the antenna radiator 1710. For example, the communication circuit 1740 may be electrically connected to a processor 1780-1 of the control circuit 1780.

According to an exemplary embodiment, the communication circuit 1740 may support various shapes of communication (e.g., cellular communication) using the antenna radiator 1710. The communication circuit 1740 may transmit/receive a Radio Frequency (RF) signal through the antenna radiator 11710. The communication circuit 1740 may include all RF components between the antenna radiator 1710 and the control circuit 1780. For example, the communication circuit 1740 may include a Radio Frequency Integrated Circuit (RFIC) and a Front End Module (FEM). The RFIC (e.g., an RF transceiver) may receive a radio frequency from a base station, and may modulate a received high frequency into a low frequency band (i.e., a baseband) that may be processed in the processor 1780-1. For example, the RFIC may modulate a low frequency processed in the processor 1780-1 into a high frequency for transmission of the base station. For example, the FEM may be a transmitting/receiving device capable of controlling the RF signal. For example, the FEM may connect the antenna radiator 1710 and the RFIC, and may separate a transmission/reception signal. For example, the FEM may play a role of filtering and amplification, and may include a receiving-side front end module including a filter for filtering a reception signal and a transmitting-side front end module including a Power Amplifier Module (PAM) for amplifying a transmission signal.

According to one or more exemplary embodiments, when receiving a radio signal, the communication circuit 1740 may receive the radio signal from the antenna radiator 1710, may convert the received radio signal into a baseband signal, and may transmit the converted baseband signal to the processor 1780-1. The processor 1780-1 may process the received baseband signal, and may control a human/machine interface of the electronic device 1700 in association with the received baseband signal.

According to one or more exemplary embodiments, when transmitting the radio signal, the processor 1780-1 may generate a baseband signal and output the signal to the communication circuit 1740. The communication circuit 1740 may receive the baseband signal from the processor 1780-1, may convert the received baseband signal into a radio signal, and may transmit the signal to the air through the antenna radiator 1710.

According to an exemplary embodiment, the communication circuit 1740 may support at least one communication scheme among Single Input Multiple Output (SIMO), Multiple Input Single Output (MISO), diversity, and Multiple Input Multiple Output (MIMO) by using the antenna radiator 1710.

According to an exemplary embodiment, the conductive member 1720 may be a metal member having various shapes and installed in the electronic device 1700. For example, the conductive member 1720 may be disposed inside a housing which forms the exterior of the electronic device 1700 or may form at least one part of one side of the housing.

According to an exemplary embodiment, the conductive member 1720 may be separated from the PCB (not shown) on which the communication circuit 1740, the wireless charging circuit 1750, and the control circuit 1780 are mounted.

According to an exemplary embodiment, the conductive member 1720 may have at least one of a shape of a metal plate, a coil-type metal pattern, or a ring-shaped metal member.

According to one or more exemplary embodiments, the conductive member 1720 may include an antenna radiator for supporting various types of communication of the communication circuit 1740.

According to one or more exemplary embodiments, the conductive member 1720 may support near-distance communication. For example, the near-distance communication may include at least one of Wireless Fidelity (WiFi), Bluetooth, Near Field Communication (NFC), Global Navigation Satellite System (GNSS), or the like.

According to one or more exemplary embodiments, the conductive member 1720 may support magnetic signal transmission/reception.

According to one or more exemplary embodiments, the conductive member 1720 may include a radiator (e.g., a wireless charging coil) for supporting the wireless charging circuit 1750. For example, the conductive member 1720 may be used to wirelessly transmit power to an external device or to wirelessly receive the power from the external device.

According to an exemplary embodiment, the conductive member 1720 may be formed on the basis of the housing manufacturing method of FIG. 1. For example, the housing of the electronic device 1700 may include a conductive coil (e.g., the conductive coil 42 of FIG. 7). The conductive coil of the housing may support various types of communication. Alternatively, the conductive coil of the housing may support wireless charging.

According to an exemplary embodiment, the conductive member 1720 may be electrically connected to the control circuit 1780. The conductive member 1720 may be electrically connected to a switch 1780-2 of the control circuit 1780, and may be electrically connected to one of the communication circuit 1740 and the wireless charging circuit 1750 according to an operation of controlling the switch 1780-2 by the processor 1780-1.

According to one or more exemplary embodiments, as described above, if the conductive member 1720 includes at least one antenna radiator for supporting communication, the communication circuit 1740 may support various types of communication using the conductive member 1720. For example, the communication circuit 1740 may include a near-distance communication circuit, and may support the near-distance communication (e.g., WiFi, Bluetooth, NFC, GNSS, or the like) with respect to an external device by using the conductive member 1720. For example, the communication circuit 1740 may include a communication circuit based on a magnetic signal, and may support magnetic signal transmission/reception (e.g., Magnetic Secure Transmission (MST) for electronic payment) with respect to the external device by using the conductive member 1720.

According to an exemplary embodiment, the conductive member 1720 may be a radiator which supports wireless charging. The wireless charging circuit 1750 may be configured to transmit power wirelessly to the external device by using the conductive member 1720, or to receive the power wirelessly from the external device. The wireless charging circuit 1750 may be configured of, for example, a magnetic resonance type, a magnetic induction type, an electromagnetic type, or the like. The wireless charging circuit 1750 may include an additional circuit for wireless charging, for example, a resonant circuit, a rectifier, or the like.

According to an exemplary embodiment, the PMIC 1760 may be electrically connected to the control circuit 1780 and the communication circuit 1740. The PMIC 1760 may effectively manage and optimize power in the system. For example, according to a load to be processed, the processor 1780-1 may transmit a signal based on the load to the PMIC 1760. The PMIC 1760 may properly regulate core voltage supplied to the processor 1780-1.

According to an exemplary embodiment, the PMIC 1760 may optimize power distribution between the battery charging circuit and the system power supply device when the wireless charging circuit 1750 is electrically connected to the control circuit 1780.

According to an exemplary embodiment, the memory 1770 may be electrically connected to the processor 1780-1 of the control circuit 1780. The memory 1770 may store a software-related program (i.e., an instruction set) executable by the processor 1780-1. The processor 1780-1 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The memory 1770 may include a fast random access memory such as one or more magnetic disc storage devices and/or a non-volatile memory, one or more optical storage devices, and/or a flash memory (e.g., NAND, NOR).

According to an exemplary embodiment of the present disclosure, the memory 1770 may include a program (hereinafter, a "switch control program") by which the control circuit 1780 controls the switch 1780-2. The terminology of "program" is also expressed as a set of instructions or an instruction set. The conductive member 1720 may be electrically connected to the communication circuit 1740 or the wireless charging circuit 1750 by the switch control program.

According to an exemplary embodiment, the switch control program may be configured to control the switch 1780-2 on the basis of various inputs generated from the electronic device 1700. For example, the switch control program may be configured to control the switch 1780-2 on the basis of at least one part of information acquired from at least one sensor (not shown) of the electronic device 1700. For example, the switch control program may be configured to control the switch 1780-2 on the basis of at least one part of a user input generated from an input unit of the electronic device 1700.

According to an exemplary embodiment, the control circuit 1780 may include the processor 1780-1 and the switch 1780-2. The processor 1780-1 may execute various software programs (an instruction set) stored in the memory 1170 to perform several functions for the electronic device 1700. The processor 1780-1 may execute the switch control program stored in the memory 1770 to control the switch 1780-2, and may perform a proper function.

According to one or more exemplary embodiments of the present disclosure, the processor 1780-1 may control the switch 1780-2 so that the conductive member 1720 is electrically connected to the communication circuit 1740. For example, if the conductive member 1720 is used for near-distance communication and if the near-distance communication is set to an active state, the processor 1780-1 may provide control such that at least one conductive member 1720 is electrically connected to the communication circuit 1740. For example, if the conductive member 1720 is used to transmit/receive a magnetic signal and if the transmission/reception of the magnetic signal is set to the active state, the processor 1780-1 may provide control such that the conductive member 1710 is electrically connected to the communication circuit 1740. The processor 1780-1 may perform corresponding communication (e.g., near-distance communication or magnetic signal-based communication) by using the conductive member 1710 and the communication circuit 1740.

According to one or more exemplary embodiments, the processor 1780-1 may control the switch 1780-2 such that the conductive member 1720 is electrically connected to the charging circuit 1750. For example, if the conductive member 1720 is used in wireless charging and is set to a state where the wireless charging is activated, the processor 1780-1 may control the switch 1780-2 such that the conductive member 1720 is electrically connected to the wireless charging circuit 1750. Herein, the processor 1780-1 may be configured to wirelessly transmit power to the external device by using the wireless charging circuit 1750 or to wirelessly receive the power from the external device.

According to one or more exemplary embodiments, the conductive member 1720 may include a 1st antenna radiator for wireless charging and a 2nd antenna radiator for near-distance communication. Herein, the wireless charging and the near-distance communication may be set to an active state or an inactive state by a user input. If the wireless charging and the near-distance communication are both set to the active state, the processor 1780-1 may control the switch 1780-2 such that the 1st antenna radiator for wireless charging is electrically connected to the wireless charging circuit 1750, and the 2nd antenna radiator for near-distance communication is electrically connected to the communication circuit 1740. For example, if the wireless charging and the near-distance communication are both set to the inactive state, the processor 1780-1 may control the switch 1780-2 such that the 1st antenna radiator for wireless charging is not electrically connected to the wireless charging circuit 1750, and the 2nd antenna radiator for near-distance communication is not electrically connected to the communication circuit 1740. For example, if the wireless charging and the near-distance communication are both set to the inactive state, the processor 1780-1 may configure at least one of the 1st antenna radiator for wireless charging and the 2nd antenna radiator for near-distance communication to an electrical floating state 1790, or may control the switch 1780-2 so as to be electrically connected to the ground member 1730.

According to one or more exemplary embodiments of the present disclosure, the conductive member 1720 in the electrical floating state 1790 may decrease an effect of an electromagnetic wave generated from the electronic device 1700 on a user's body.

According to one or more exemplary embodiments, the conductive member 1720 in the electrical floating state 1790 may support maintaining the antenna performance of an antenna device using the antenna radiator 1710.

According to one or more exemplary embodiment, the conductive member 1720 electrically connected to the ground member 1730 (e.g., a PCB ground) may support maintaining the antenna performance of the antenna device using the antenna radiator 1710.

According to one or more exemplary embodiments of the present disclosure, the conductive member 1720 electrically connected to the ground member 1730 (e.g., a PCB ground) may decrease the effect of the electromagnetic wave generated from the electronic device 1700 on the user's body.

According to one or more exemplary embodiments of the present disclosure, the electronic device 1700 may include various other constitutional elements. For example, the electronic device 1700 may further include other constitutional elements (not shown) such as a sensor module, an input unit, a display, an audio module, a camera module, or the like.

Figure 18:
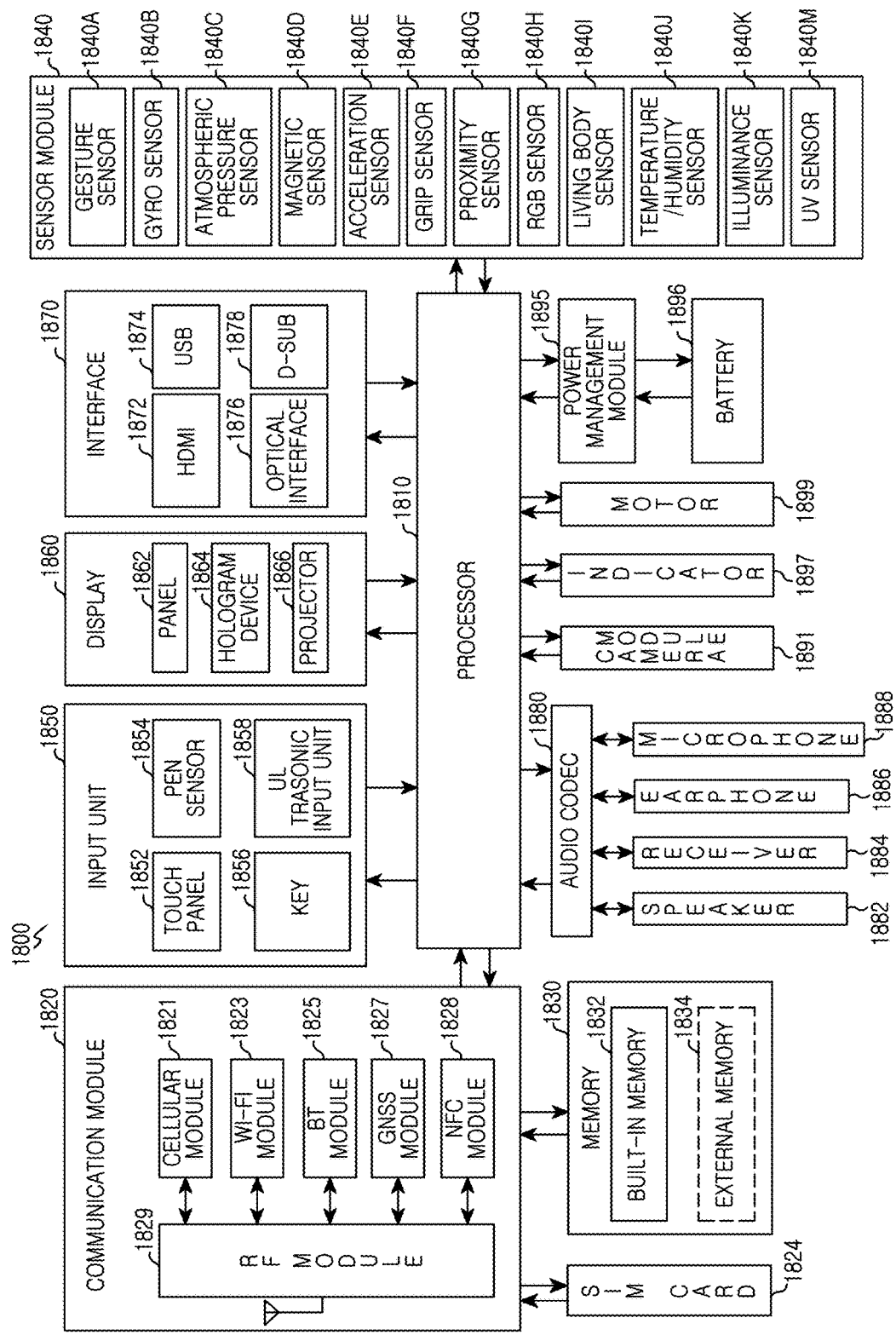
FIG. 18 is a block diagram of an electronic device according to various exemplary embodiments of the present disclosure.

FIG. 18 is a block diagram of an electronic device according to various exemplary embodiments.

The electronic device 1801 may include, for example, all or some parts of the electronic device 1000 of FIG. 10. The electronic device 1801 may include one or more processors (e.g., Application Processors (APs)) 1810, a communication module 1820, a subscriber identity module 1824, a memory 1830, a sensor module 1840, an input unit 1850, a display 1860, an interface 1870, an audio module 1880, a camera module 1891, a power management module 1895, a battery 1896, an indicator 1897, and a motor 1898.

The processor 1810 may control a plurality of hardware or software constitutional elements connected to the processor 1810 by driving, for example, an operating system or an application program, and may process a variety of data including multimedia data and may perform an arithmetic operation. The processor 1810 may be implemented, for example, with a System on Chip (SoC). According to an exemplary embodiment, the processor 1810 may further include a Graphic Processing Unit (GPU) and/or an image signal processor. The processor 1810 may include at least one part (e.g., a cellular module 1821) of the aforementioned constitutional elements of FIG. 18. The processor 1810 may process an instruction or data, which is received from at least one of different constitutional elements (e.g., a non-volatile memory), by loading it to a volatile memory and may store a variety of data in the non-volatile memory.

The communication module 1820 may include, for example, the cellular module 1821, a Wi-Fi module 1823, a BlueTooth (BT) module 1825, a Global Positioning System (GPS) module 1827, a Near Field Communication (NFC) module 1828, and a Radio Frequency (RF) module 1829.

The cellular module 1821 may provide a voice call, a video call, a text service, an Internet service, or the like, for example, through a communication network. According to an exemplary embodiment, the cellular module 1821 may identify and authenticate the electronic device 1801 in the communication network by using a subscriber identity module (e.g., a Subscriber Identity Module (SIM) card) 1824. According to an exemplary embodiment, the cellular module 1821 may perform at least some functions that can be provided by the processor 1810. According to an exemplary embodiment, the cellular module 1821 may include a Communication Processor (CP).

The WiFi module 1823, the Bluetooth module 1825, the GNSS module 1827, or the NFC module 1828 may include, for example, a processor for processing data transmitted/received through a corresponding module. According to a certain exemplary embodiment, at least some (e.g., two or more) of the cellular module 1821, the WiFi module 1823, the BT module 1825, the GPS module 1827, and the NFC module 1828 may be included in one Integrated Chip (IC) or IC package.

The RF module 1829 may transmit/receive, for example, a communication signal (e.g., a Radio Frequency (RF) signal). The RF module 1829 may include, for example, a transceiver, a Power Amp Module (PAM), a frequency filter, a Low Noise Amplifier (LNA), an antenna, or the like. According to another exemplary embodiment, at least one of the cellular module 1821, the WiFi module 1823, the BT module 1825, the GPS module 1827, and the NFC module 1828 may transmit/receive an RF signal via a separate RF module.

The subscriber identity module 1824 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 1830 may include, for example, an internal memory 1832 or an external memory 1834. The internal memory 1832 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 1834 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 1834 may be operatively and/or physically connected to the electronic device 1801 via various interfaces.

The sensor module 1840 may measure, for example, physical quantity or detect an operational status of the electronic device 1801, and may convert the measured or detected information into an electric signal. The sensor module 1840 may include, for example, at least one of a gesture sensor 1840A, a gyro sensor 1840B, a pressure sensor 1840C, a magnetic sensor 1840D, an acceleration sensor 1840E, a grip sensor 1840F, a proximity sensor 1840G, a color sensor 1840H (e.g., a Red, Green, Blue (RGB) sensor), a bio sensor 1840I, a temperature/humidity sensor 1840I, an illumination sensor 1840K, and an Ultra Violet (UV) sensor 1840M. Additionally or alternatively, the sensor module 1840 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a finger scan sensor. The sensor module 1840 may further include a control circuit for controlling at least one or more sensors included therein. In a certain exemplary embodiment, the electronic device 1801 may further include a processor configured to control the sensor module 1804 either separately or as one part of the processor 1810, and may control the sensor module 1840 while the processor 1810 is in a sleep state.

The input unit 1850 may include, for example, a touch panel 1852, a (digital) pen sensor 1854, a key 1856, or an ultrasonic input unit 1858. The touch panel 1852 may recognize a touch input, for example, by using at least one of an electrostatic type, a pressure-sensitive type, and an ultrasonic type. In addition, the touch panel 1852 may further include a control circuit. The touch panel 1852 may further include a tactile layer and thus may provide the user with a tactile reaction.

The (digital) pen sensor 1854 may be, for example, one part of a touch panel, or may include an additional sheet for recognition. The key 1856 may be, for example, a physical button, an optical key, a keypad, or a touch key. The ultrasonic input unit 1858 may detect an ultrasonic wave generated from an input means through a microphone (e.g., a microphone 1888) to confirm data corresponding to the detected ultrasonic wave.

The display 1860 may include a panel 1862, a hologram 1864, a projector 1866, and/or a control circuit for controlling these elements. The panel 1862 may be implemented, for example, in a flexible, transparent, or wearable manner. The panel 1862 may be constructed as one module with the touch panel 1852. The hologram 1864 may use an interference of light and show a stereoscopic image in the air. The projector 1866 may display an image by projecting a light beam onto a screen. The screen may be located, for example, inside or outside the electronic device 1801. According to an exemplary embodiment, the display 1860 may further include a control circuit for controlling the panel 1862, the hologram 1864, or the projector 1866.

The interface 1870 may include, for example, a High-Definition Multimedia Interface (HDMI) 1872, a Universal Serial Bus (USB) 1874, an optical communication interface 1876, or a D-subminiature (D-sub) 1878. Additionally or alternatively, the interface 1870 may include, for example, a Mobile High-definition Link (MHL) interface, a Secure Digital (SD)/Multi-Media Card (MMC) interface, or an Infrared Data Association (IrDA) standard interface.

The audio module 1880 may bilaterally convert, for example, a sound and electric signal. The audio module 1880 may convert sound information which is input or output, for example, through a speaker 1882, a receiver 1884, an earphone 1886, the microphone 1888, or the like.

The camera module 1891 is, for example, a device for image and video capturing, and according to an exemplary embodiment, may include one or more image sensors (e.g., a front sensor or a rear sensor), a lens, an Image Signal Processor (ISP), or a flash (e.g., LED or xenon lamp).

The power management module 1895 may manage, for example, power of the electronic device 1801. According to an exemplary embodiment, the power management module 1895 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 1896 and voltage, current, and temperature during charging. The battery 1896 may include, for example, a rechargeable battery and/or a solar battery.

The indicator 1897 may display a specific state, for example, a booting state, a message state, a charging state, or the like, of the electronic device 1801 or one part thereof (e.g., the processor 1810). The motor 1898 may convert an electric signal into a mechanical vibration, and may generate a vibration or haptic effect. Although not shown, the electronic device 1801 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), MediaFlo™, or the like.

According to an exemplary embodiment of the present disclosure, an electronic device may include a housing having a first side facing a first direction, and a second side facing a second direction opposite to the first direction, a communication circuit disposed inside the housing, a display exposed through the first side of the housing, a conductive plate formed adjacent to the second side of the housing, a conductive coil formed inside the conductive plate when viewed from a top of the second side, and having a plurality of turns electrically connected to the communication circuit, a first non-conductive material formed inside the conductive plate when viewed from the top of the second side, and disposed at least partially between the conductive plate and the conductive coil and/or between the plurality of turns of the conductive coil, and a second non-conductive material for forming at least one part of the second side, while covering the conductive plate, the conductive coil, and the first non-conductive material.

According to an exemplary embodiment of the present invention, the conducive coil may be constructed of a single coil having the plurality of turns.

According to an exemplary embodiment of the present invention, the first non-conductive material may have at least one groove which is concave in the first direction.

According to an exemplary embodiment of the present invention, the second non-conductive material may fill the at least one groove.

According to an exemplary embodiment of the present invention, at least one part of the at least one groove may be arranged on one virtual straight line.

According to an exemplary embodiment of the present invention, the electronic device may further include a shielding material disposed between the second non-conductive material and the first side of the housing.

According to an exemplary embodiment of the present invention, the electronic device may further include a battery packet disposed between the first side and second side of the housing. The shielding material may be disposed between the conductive coil and the battery pack.

According to an exemplary embodiment of the present invention, the conductive plate and the conductive coil may be physically separated.

According to an exemplary embodiment of the present invention, a Flexible Printed Circuit Board (FPCB) may be further included. One end of the FPCB may be electrically connected to one end of the conductive coil, and the other end of the FPCB and the other end of the conductive coil may be electrically connected to the communication circuit. A connection portion between the one end and the other end of the FPCB may overlap with a plurality of turns of the conductive coil.

According to an exemplary embodiment of the present invention, the conductive coil may have a square spiral shape.

According to an exemplary embodiment of the present invention, the communication circuit may support near-field communication or magnetic signal transmission/reception.

According to an exemplary embodiment of the present invention, a wireless charging circuit electrically connected to the conductive coil may be further included.

According to an exemplary embodiment of the present invention, the electronic device may further include a control circuit. The control circuit may selectively connect the conductive coil to the communication circuit and the wireless charging circuit.

According to another exemplary embodiment of the present invention, a method of manufacturing a housing of an electronic device may include forming a conductive plate, a conducive coil having a plurality of turns, and a plurality of bridges by removing one part of a base metal. Herein, the plurality of bridges may have at least one first bridge for connecting between the conductive plate and the conductive coil and at least one second bridge for connecting between the plurality of conductive coils. The method of manufacturing the housing of the electronic device may include coupling a non-conductive member to the conductive plate, the conductive coil, and the plurality of bridges, and separating physically the conductive plate and the conductive coil by removing the plurality of bridges.

According to another exemplary embodiment of the present invention, the plurality of bridges may have a thinner thickness than the conductive plate and the conductive coil.

According to another exemplary embodiment of the present invention, the conductive coil may have a square spiral shape.

According to another exemplary embodiment of the present invention, the conductive plate may have a ring shape for surrounding the conductive coil.

According to another exemplary embodiment of the present invention, the coupling of the non-conductive member may use insert injection.

According to another exemplary embodiment of the present invention, the non-conductive member may include a first portion at least partially disposed between the conductive plate and the conductive coil and/or the plurality of turns of the conductive coil, and a second portion at least partially forming one side while covering the conductive plate, the conductive coil, and the first portion.

According to another exemplary embodiment of the present invention, the method of manufacturing the housing of the electronic device may further include coupling a Flexible Printed Circuit Board (FPCB). Herein, one end of the FPCB may be electrically connected to one end of the conductive coil. The other end of the FPCB and the other end of the conductive coil may be electrically connected to the communication circuit. A connection portion between the one end and the other end of the FPCB may overlap with the plurality of turns of the conductive coil.

Each of constitutional elements described in the present may consist of one or more components, and names thereof may vary depending on a type of an electronic device. The electronic device according to various exemplary embodiments may include at least one of the constitutional elements described in the present document. Some of the constitutional elements may be omitted, or additional other constitutional elements may be further included. Further, some of the constitutional elements of the electronic device according to various exemplary embodiments may be combined and constructed as one entity, so as to equally perform functions of corresponding constitutional elements before combination.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising:
   a housing having a first side facing a first direction, and a second side facing a second direction opposite to the first direction;
   a communication circuit disposed inside the housing;
   a display exposed through the first side of the housing;
   a conductive plate formed adjacent to the second side of the housing;
   a conductive coil formed inside the conductive plate when viewed from a top of the second side, and having a plurality of turns electrically connected to the communication circuit;
   a first non-conductive material formed inside the conductive plate when viewed from the top of the second side, and disposed at least partially between the conductive plate and the conductive coil and/or between the plurality of turns of the conductive coil; and
   a second non-conductive material for forming at least one part of the second side, and covering the conductive plate, the conductive coil, and the first non-conductive material.

2. The electronic device of claim 1, wherein the conducive coil is constructed of a single coil having the plurality of turns.

3. The electronic device of claim 1, wherein the first non-conductive material has at least one groove which is concave in the first direction.

4. The electronic device of claim 3, wherein the second non-conductive material fills the at least one groove.

5. The electronic device of claim 3, wherein at least one part of the at least one groove is arranged on one virtual straight line.

6. The electronic device of claim 1, further comprising a shielding material disposed between the second non-conductive material and the first side of the housing.

7. The electronic device of claim 6, further comprising a battery packet disposed between the first side and second side of the housing, wherein the shielding material is disposed between the conductive coil and the battery pack.

8. The electronic device of claim 1, wherein the conductive plate and the conductive coil are physically separated.

9. The electronic device of claim 1, further comprising a Flexible Printed Circuit Board (FPCB), wherein one end of the FPCB is electrically connected to one end of the conductive coil, the other end of the FPCB and the other end of the conductive coil are electrically connected to the communication circuit, and a connection portion between the one end and the other end of the FPCB overlaps with the plurality of turns of the conductive coil.

10. The electronic device of claim 1, wherein the conductive coil has a square spiral shape.

11. The electronic device of claim 1, wherein the communication circuit supports near-field communication or magnetic signal transmission/reception.

12. The electronic device of claim 1, further comprising a wireless charging circuit electrically connected to the conductive coil.

13. The electronic device of claim 12, further comprising a control circuit, wherein the control circuit selectively connects the conductive coil to the communication circuit and the wireless charging circuit.

* * * * *